US011153917B2

(12) United States Patent
Liu et al.

(10) Patent No.: US 11,153,917 B2
(45) Date of Patent: *Oct. 19, 2021

(54) SYSTEM AND METHOD FOR RANDOM ACCESS BACKOFFS

(71) Applicant: Futurewei Technologies, Inc., Plano, TX (US)

(72) Inventors: Bin Liu, San Diego, CA (US); Yongbo Zeng, Beijing (CN); Jian Wang, Beijing (CN); Guorong Li, Beijing (CN); Yu Cai, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/894,297

(22) Filed: Jun. 5, 2020

(65) Prior Publication Data
US 2020/0396771 A1    Dec. 17, 2020

Related U.S. Application Data

(63) Continuation of application No. 16/160,776, filed on Oct. 15, 2018, now Pat. No. 10,687,367, which is a continuation of application No. 15/659,909, filed on Jul. 26, 2017, now Pat. No. 10,149,325, which is a continuation of application No. 15/451,983, filed on Mar. 7, 2017, now abandoned.
(Continued)

(51) Int. Cl.
*H04W 74/08* (2009.01)
*H04W 72/04* (2009.01)

(52) U.S. Cl.
CPC ... *H04W 74/0833* (2013.01); *H04W 72/0413* (2013.01); *H04W 74/0841* (2013.01)

(58) Field of Classification Search
CPC ......... H04W 74/0833; H04W 74/0841; H04W 72/0413
See application file for complete search history.

(56) References Cited

U.S. PATENT DOCUMENTS 8,576,780 B2    11/2013  Vujcic
9,674,874 B2     6/2017  Wang et al.
(Continued)

FOREIGN PATENT DOCUMENTS

CN    102291836 A    12/2011
CN    102440057 A     5/2012
(Continued)

OTHER PUBLICATIONS

3GPP TS 36.211 V13.0.0 (Dec. 2015), 3rd Generation Partnership Project; Technical Specification Group Radio Access Network; Evolved Universal Terrestrial Radio Access (E-UTRA); Physical channels and modulation (Release 13), Dec. 2015, total 141 pages.
(Continued)

*Primary Examiner* — Kevin D Mew
(74) *Attorney, Agent, or Firm* — Slater Matsil, LLP

(57) ABSTRACT

A method of performing a random access procedure includes randomly selecting a backoff time from within a backoff window ranging from 0 to a specified multiple of a random access preamble unit, waiting until a time initialized with the backoff time expires, and retransmitting a random access preamble.

31 Claims, 13 Drawing Sheets

Related U.S. Application Data

(60) Provisional application No. 62/308,021, filed on Mar. 14, 2016.

(56) References Cited

U.S. PATENT DOCUMENTS

| | | | |
|---|---|---|---|
| 9,743,431 | B2 | 8/2017 | Dinan |
| 9,781,585 | B2 | 10/2017 | Sheng |
| 2007/0064665 | A1 | 3/2007 | Zhang et al. |
| 2007/0206531 | A1 | 9/2007 | Pajukoski et al. |
| 2008/0043671 | A1 | 2/2008 | Moon et al. |
| 2008/0240143 | A1 | 10/2008 | Koga et al. |
| 2009/0201798 | A1 | 8/2009 | Lee et al. |
| 2009/0209248 | A1 | 8/2009 | Lee et al. |
| 2009/0274077 | A1 | 11/2009 | Meylan et al. |
| 2010/0135210 | A1* | 6/2010 | Kim .............. H04L 1/06 370/328 |
| 2010/0202288 | A1* | 8/2010 | Park ............. H04W 74/0833 370/230 |
| 2010/0232364 | A1 | 9/2010 | Hsu |
| 2010/0296467 | A1* | 11/2010 | Pelletier ........ H04W 72/042 370/329 |
| 2010/0309877 | A1 | 12/2010 | Damnjanovic et al. |
| 2011/0116364 | A1 | 5/2011 | Zhang et al. |
| 2011/0261763 | A1 | 10/2011 | Chun et al. |
| 2012/0039295 | A1 | 2/2012 | Quan et al. |
| 2012/0076126 | A1 | 3/2012 | Yi et al. |
| 2012/0106467 | A1 | 5/2012 | Takahashi et al. |
| 2012/0275429 | A1* | 11/2012 | Chin ............. H04W 74/085 370/331 |
| 2012/0320874 | A1* | 12/2012 | Li ............. H04W 48/12 370/331 |
| 2013/0034059 | A1* | 2/2013 | Lee ............ H04W 74/006 370/328 |
| 2013/0039274 | A1* | 2/2013 | Lee ........... H04W 74/0833 370/328 |
| 2013/0107778 | A1* | 5/2013 | Ryu ............ H04W 76/28 370/311 |
| 2013/0128733 | A1* | 5/2013 | Lee ............ H04W 74/04 370/230 |
| 2013/0188580 | A1 | 6/2013 | Dinan |
| 2013/0182668 | A1* | 7/2013 | Xu ............ H04W 74/0833 370/329 |
| 2013/0188612 | A1 | 7/2013 | Dinan |
| 2013/0223362 | A1 | 8/2013 | Alfano et al. |
| 2013/0244652 | A1 | 9/2013 | Park et al. |
| 2013/0265866 | A1* | 10/2013 | Yi ............ H04W 74/0858 370/216 |
| 2013/0322339 | A1* | 12/2013 | Ohta ........... H04W 74/0833 370/328 |
| 2014/0098667 | A1* | 4/2014 | Choi ........... H04B 7/2609 370/230 |
| 2014/0112286 | A1 | 4/2014 | Ahn et al. |
| 2014/0317456 | A1 | 10/2014 | Kim et al. |
| 2014/0328325 | A1 | 11/2014 | Bai et al. |
| 2014/0349712 | A1 | 11/2014 | Shukla |
| 2015/0043489 | A1 | 2/2015 | Tseng |
| 2015/0124679 | A1* | 5/2015 | Yi ............ H04W 24/08 370/311 |
| 2015/0173074 | A1* | 6/2015 | Zhao ........... H04W 74/085 370/336 |
| 2015/0282214 | A1 | 10/2015 | Lee et al. |
| 2015/0334748 | A1 | 11/2015 | Yu |
| 2016/0094975 | A1* | 3/2016 | Sheng ........... H04W 8/005 370/216 |
| 2016/0100431 | A1 | 4/2016 | Kishiyama et al. |
| 2016/0183225 | A1 | 6/2016 | Ahn et al. |
| 2017/0215209 | A1* | 7/2017 | Wang ........... H04W 76/18 |
| 2017/0265230 | A1 | 9/2017 | Liu et al. |
| 2017/0290064 | A1 | 10/2017 | Liu |
| 2017/0325268 | A1 | 11/2017 | Liu et al. |
| 2017/0359114 | A1* | 12/2017 | Akkarakaran ........ H04B 7/088 |
| 2018/0270869 | A1* | 9/2018 | Tsai ........... H04W 74/006 |
| 2019/0044659 | A1* | 2/2019 | Aln s ........... H04W 16/26 |

FOREIGN PATENT DOCUMENTS

| | | |
|---|---|---|
| CN | 102763482 A | 10/2012 |
| CN | 103067880 A | 4/2013 |
| CN | 103718636 A | 4/2014 |
| CN | 103763784 A | 4/2014 |
| CN | 104919885 A | 9/2015 |
| CN | 105210442 A | 12/2015 |
| EP | 2395803 A1 | 12/2011 |
| EP | 2496037 A1 | 9/2012 |
| JP | 2009506643 A | 2/2009 |
| JP | 2009524324 A | 6/2009 |
| JP | 2009153048 A | 7/2009 |
| JP | 2010183531 A | 8/2010 |
| JP | 2013055461 A | 3/2013 |
| JP | 2015146633 A | 8/2015 |
| WO | 2007024791 A2 | 3/2007 |
| WO | 2007083230 A2 | 7/2007 |
| WO | 2011160579 A1 | 12/2011 |
| WO | 2015116732 A1 | 8/2015 |
| WO | 2015191347 A1 | 12/2015 |
| WO | 2016025899 A1 | 2/2016 |

OTHER PUBLICATIONS

3GPP TS 36.300 V13.2.0 (Dec. 2015), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), Dec. 2015, total 290 pages.

3GPP TS 36.321 V13.0.0 (Dec. 2015), 3rd Generation Partnership Project; Technical Specification Group Radio Access Network; Evolved Universal Terrestrial Radio Access (E-UTRA); Medium Access Control (MAC) protocol specification (Release 13), Dec. 2015, total 82 pages.

3GPP TS 36.331 V12.8.0 (Dec. 2015), 3rd Generation Partnership Project;Technical Specification Group Radio Access Network; Evolved Universal Terrestrial Radio Access (E-UTRA); Radio Resource Control (RRC); Protocol specification (Release 12), Dec. 2015, total 456 pages.

Ericsson, "Remaining issues on random access for Rel-13 low complexity and enhanced coverage UEs," 3GPP TSG-RAN WG2 #92, R2-156774, Anaheim, USA, Nov. 16-20, 2015, 11 pages.

Huawei, et al, "NB-PRACH design," 3GPP TSG RAN WG1 Meeting #84, R1-160316, St. Julian's Malta, Feb. 15-19, 2016, 8 pages.

Ericsson, "Use of RA back-off indicator," 3GPP TSG-RAN2 Meeting #93, R2-161639, St. Julian, Malta, Feb. 15-19, 2016, 3 pages.

CMCC, et al., "Diffemtiate access causes in RACH backoff-Further discussion," 3GPP TSG-RAN WG2#61bis, R2-081631, Agenda Item 5.1.16, Shenzhen, China, Mar. 31-Apr. 4, 2008, 3 pages.

"3rd Generation Partnership Project; Technical Specification Group Radio Access Network; Evolved Universal Terrestrial Radio Access (E-UTRA); Physical layer procedures (Release 9)", 3GPP TS 36.213 V9.3.0, Technical Specification, Sep. 2010, 80 Pages.

Kim, D., et al., "Adaptive Random Access Preamble Split in LTE", 2013 9th International Wireless Communications and Mobile Computing Conference (IWCMC), Jul. 1-5, 2013, 6 Pages, Sardinia, Italy.

Xiaowei, J., "Research on Relay and M2M Random Access Technology of LTE-Advanced", A Thesis Submitted in Partial Fulfullment of the Requirements of the Degree of Master of Engineering, English Abstract Only, Jan. 2011, 64 Pages.

Huawei, et al., "Remaining NB-IoT random access physical layer aspects", 3GPP TSG RAN WG1 Meeting #84, R1-160327, Feb. 15-19, 2016, 4 Pages, St Julian's, Malta.

* cited by examiner

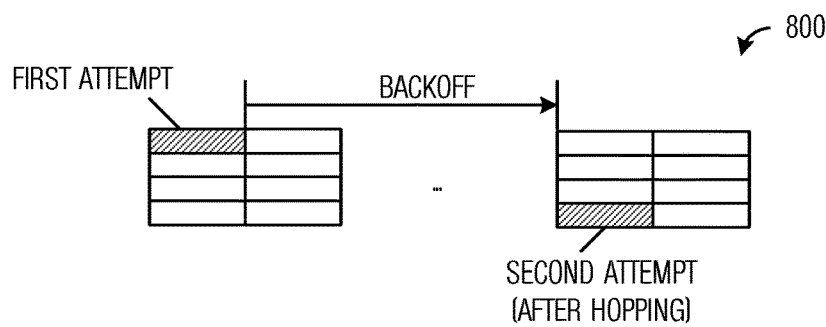
Fig. 7
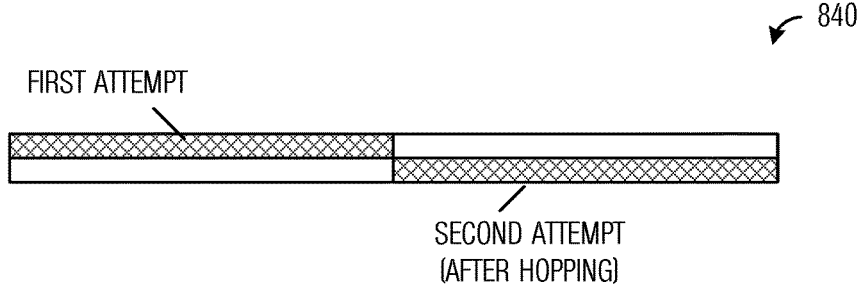
Fig. 8A
Fig. 8C

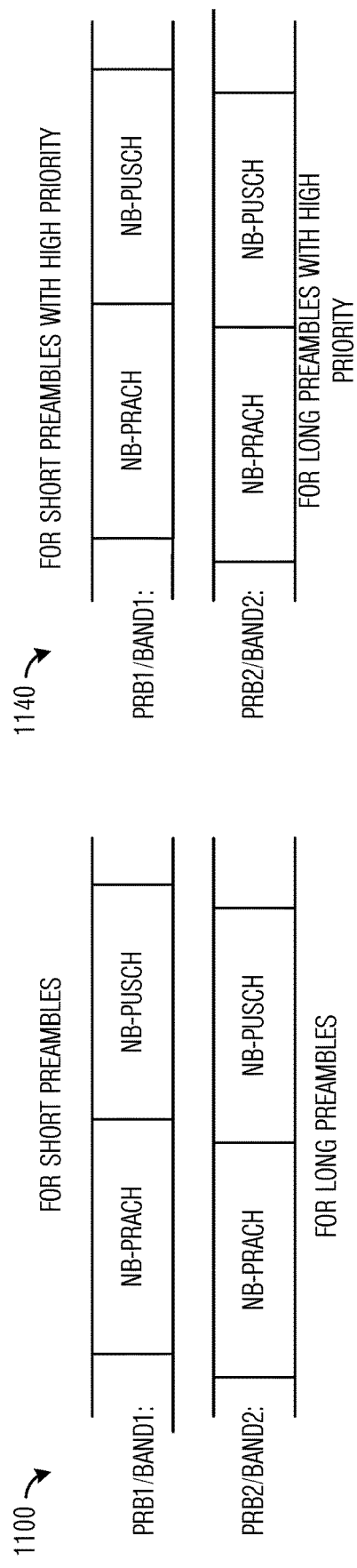
Fig. 11A
Fig. 11B
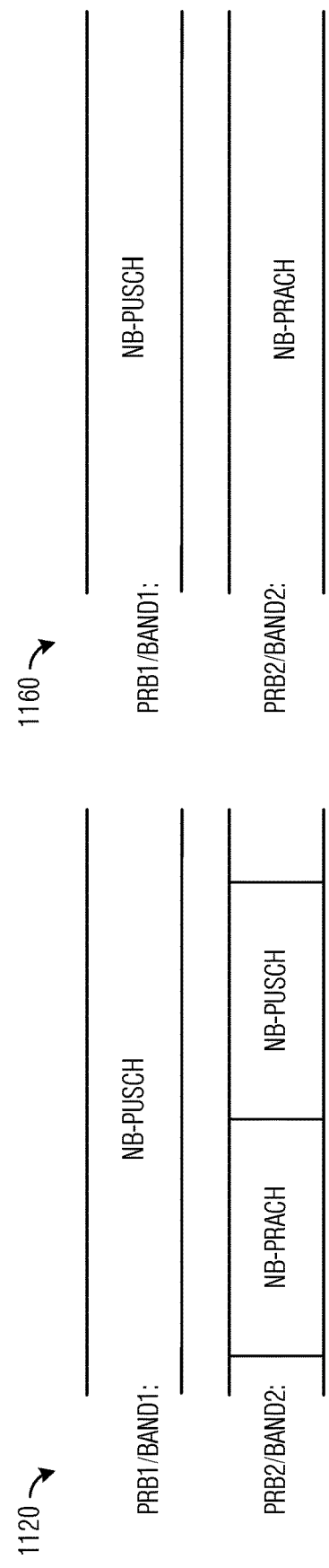
Fig. 11C
Fig. 11D

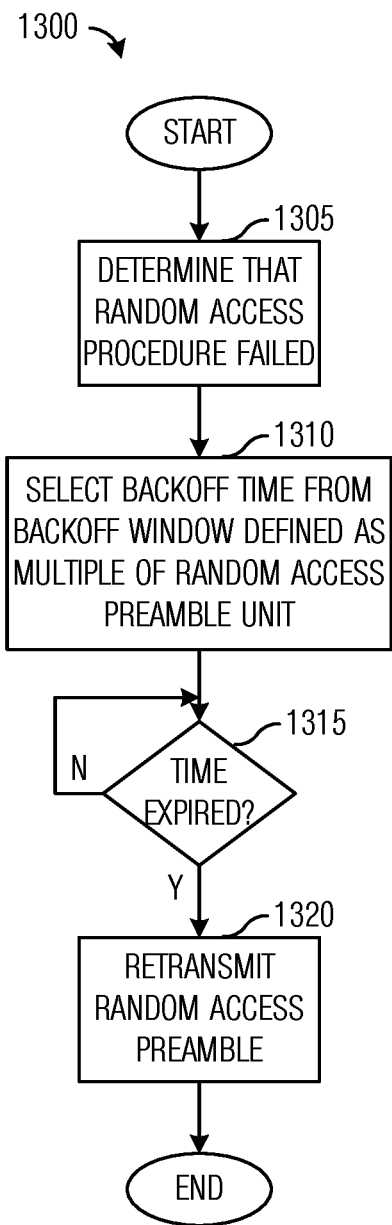
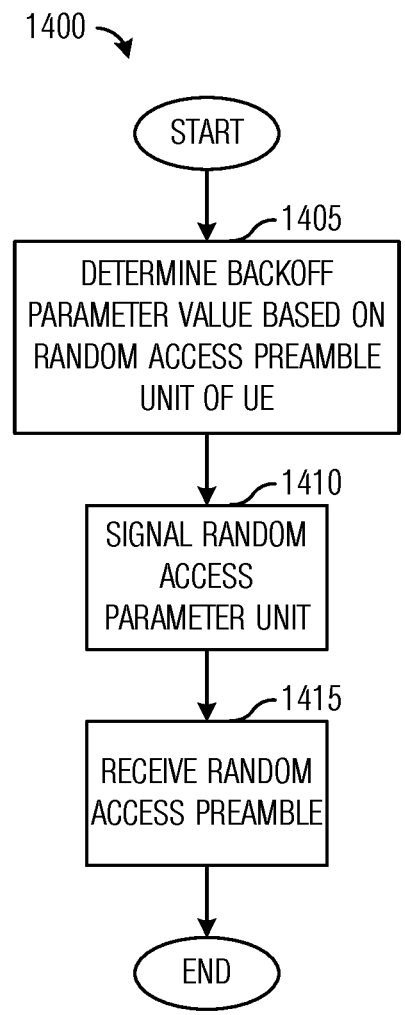
Fig. 13
Fig. 14

(A) CONTINUOUS ALLOCATION (B) MIXED ALLOCATION

SYSTEM AND METHOD FOR RANDOM ACCESS BACKOFFS

CROSS-REFERENCE TO RELATED APPLICATIONS

This application is a continuation of U.S. patent application Ser. No. 16/160,776, filed on Oct. 15, 2018, entitled "System and Method for Random Access Backoffs," which is a continuation of U.S. patent application Ser. No. 15/659,909, filed on Jul. 26, 2017, entitled "System and Method for Random Access Backoffs," (Now U.S. Pat. No. 10,149,325 issued on Dec. 4, 2018), which is a continuation of U.S. patent application Ser. No. 15/451,983, filed on Mar. 7, 2017, entitled "System and Method for Random Access Backoffs," which claims the benefit of U.S. Provisional Application No. 62/308,021, filed on Mar. 14, 2016, entitled "System and Method for Random Access Backoffs," all of which applications are hereby incorporated herein by reference in their entireties.

TECHNICAL FIELD

The present invention relates generally to a system and method for digital communications, and, in particular embodiments, to a system and method for random access backoffs.

BACKGROUND

When a user equipment (UE) initially attaches to a network or participates in a handover between cells, a random access procedure is performed by the UE and the entity (such as an evolved NodeB (eNB), low power node (LPN), and so on) to which it is attaching in order to setup a connection with the entity.

SUMMARY

Example embodiments provide a system and method for random access backoffs.

In accordance with an example embodiment, a method for performing a random access procedure is provided. The method includes randomly selecting, by a user equipment (UE), a backoff time from within a backoff window ranging from 0 to a specified multiple of a random access preamble unit, waiting, by the UE, until a time initialized with the backoff time expires, and retransmitting, by the UE, a random access preamble.

The specified multiple is one of a plurality of specified multiples, and different specified multiples are selected for random access preambles with different durations. There is a plurality of sets of specified multiples, and the specified multiple is selected from one of the plurality of sets of specified multiples in accordance with a duration of the random access preamble. The random access preamble is initially transmitted on one of a first carrier or a first band, and the random access preamble is retransmitted on one of a second carrier or a second band.

The randomly selecting the backoff time includes selecting an initial backoff time within a step of a predefined period, and selecting the backoff time within the initial backoff time. The method also includes segmenting the random access preamble into a plurality of blocks, wherein retransmitting the random access preamble comprises separately transmitting each of the plurality of blocks. The separately transmitting each of the plurality of blocks includes interleaving at least some of the plurality of blocks with an uplink data channel.

The random access preamble is transmitted in a network resource, and wherein the network resource also includes a gap inserted after the network resource so that a duration of the network resource and a gap time associated with the gap is equal to an integer multiple of a subframe duration.

In accordance with an example embodiment, a method for performing a random access procedure is provided. The method includes determining, by an evolved NodeB (eNB), a backoff parameter value in accordance with a random access preamble unit associated with a UE participating in the random access procedure, signaling, by the eNB, an indicator of the backoff parameter value, and receiving, by the eNB, a random access preamble in accordance with the backoff parameter value.

The backoff parameter value specifies a multiple of the random access preamble unit. There is a plurality of sets of specified multiples, and the specified multiple is selected from one of the plurality of sets of specified multiples in accordance with a duration of the random access preamble. The method also includes selecting a step of a predefined period, and signaling an indicator of the step of the predefined period. The random access preamble is segmented into a plurality of blocks, and receiving the random access preamble includes separately receiving each of the plurality of blocks. The method also includes receiving an uplink data channel interleaved with at least some of the plurality of blocks.

In accordance with an example embodiment, a method for transmitting a random access preamble is provided. The method includes generating, by a UE, the random access preamble, and when a number of physical random access channel (PRACH) repetitions per attempt is larger than a threshold, segmenting, by the UE, the random access preamble into a plurality of blocks, and separately transmitting, by the UE, each of the plurality of blocks. Separately transmitting each of the plurality of blocks includes interleaving at least some of the plurality of blocks with an uplink data channel.

In accordance with an example embodiment, a non-transitory computer-readable medium storing programming for execution by at least one processor is provided. The programming including instructions to randomly select a backoff time from within a backoff window ranging from 0 to a specified multiple of a random access preamble unit, wait until a time initialized with the backoff time expires, and retransmit a random access preamble.

The specified multiple is one of a plurality of specified multiples, and the programming includes instructions to apply different specified multiples for random access preambles of different durations. There is a plurality of sets of specified multiples, and the programming includes instructions to select the specified multiple from one of the plurality of sets of specified multiples in accordance with a duration of the random access preamble. The programming includes instructions to select an initial backoff time within a step of a predefined period, and select the backoff time within the initial backoff time. The programming includes instructions to segment the random access preamble into a plurality of blocks, and separately transmit each of the plurality of blocks.

Practice of the foregoing embodiments enables the adaptation of the backoff window used in contention resolution to meet the extended preamble durations of narrow band communications systems. Fixed backoff windows cannot effectively deal with channel contention without sacrificing overall efficiency.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 7 illustrates a table of example backoff parameter values with different sets of backoff parameter values assigned to different random access preamble durations according to example embodiments disclosed herein;

FIG. 8A illustrates a time-frequency graph highlighting first example NB-PRACH operation in accordance with example embodiment 3;

FIG. 8C illustrates a time-frequency graph highlighting third example NB-PRACH operation in accordance with example embodiment 3;

FIG. 11A illustrates a diagram of two bands or PRBs used for multiplexing channels of the same coverage level according to example embodiments disclosed herein;

FIG. 11B illustrates a diagram of two bands or PRBs when at least one of the bands or PRBs has unused resources according to example embodiments disclosed herein;

FIG. 11C illustrates a diagram of two bands or PRBs highlighting priority based allocation according to example embodiments disclosed herein;

FIG. 11D illustrates a diagram of two bands or PRBs with separate band or PRB allocation according to example embodiments disclosed herein;

FIG. 13 illustrates a flow diagram of example operations occurring in a UE participating in a random access procedure according to example embodiments disclosed herein;

FIG. 14 illustrates a flow diagram of example operations occurring in an eNB participating in a random access procedure according to example embodiments disclosed herein;

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
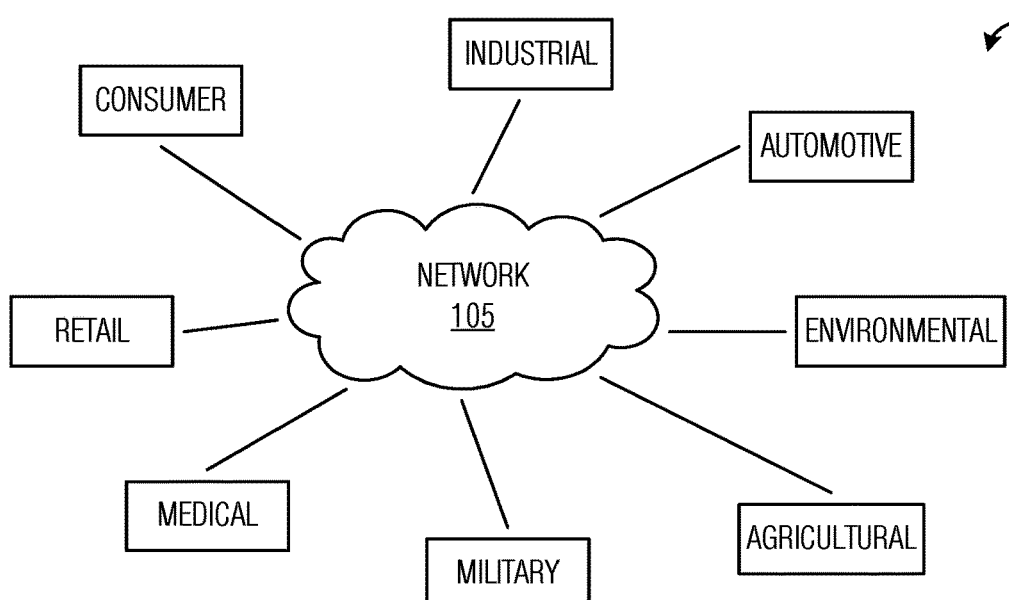
FIG. 1 illustrates a high-level diagram of an Internet of Things (IoT) communications system.

FIG. 1 illustrates a high-level diagram of an Internet of Things (IoT) communications system 100. IoT communications system 100 includes a network 105 that is connected to a wide variety of IoT devices, including electrical devices, physical objects, and other items, that are consumer, industrial, automotive, environment, agricultural, military, medical, and retail in nature. Network 105 allows the IoT devices to be connected, as well as controlled. Network 105 may be any existing communications infrastructure, such as the Internet, a private or public data network, and so on.

Figure 2:
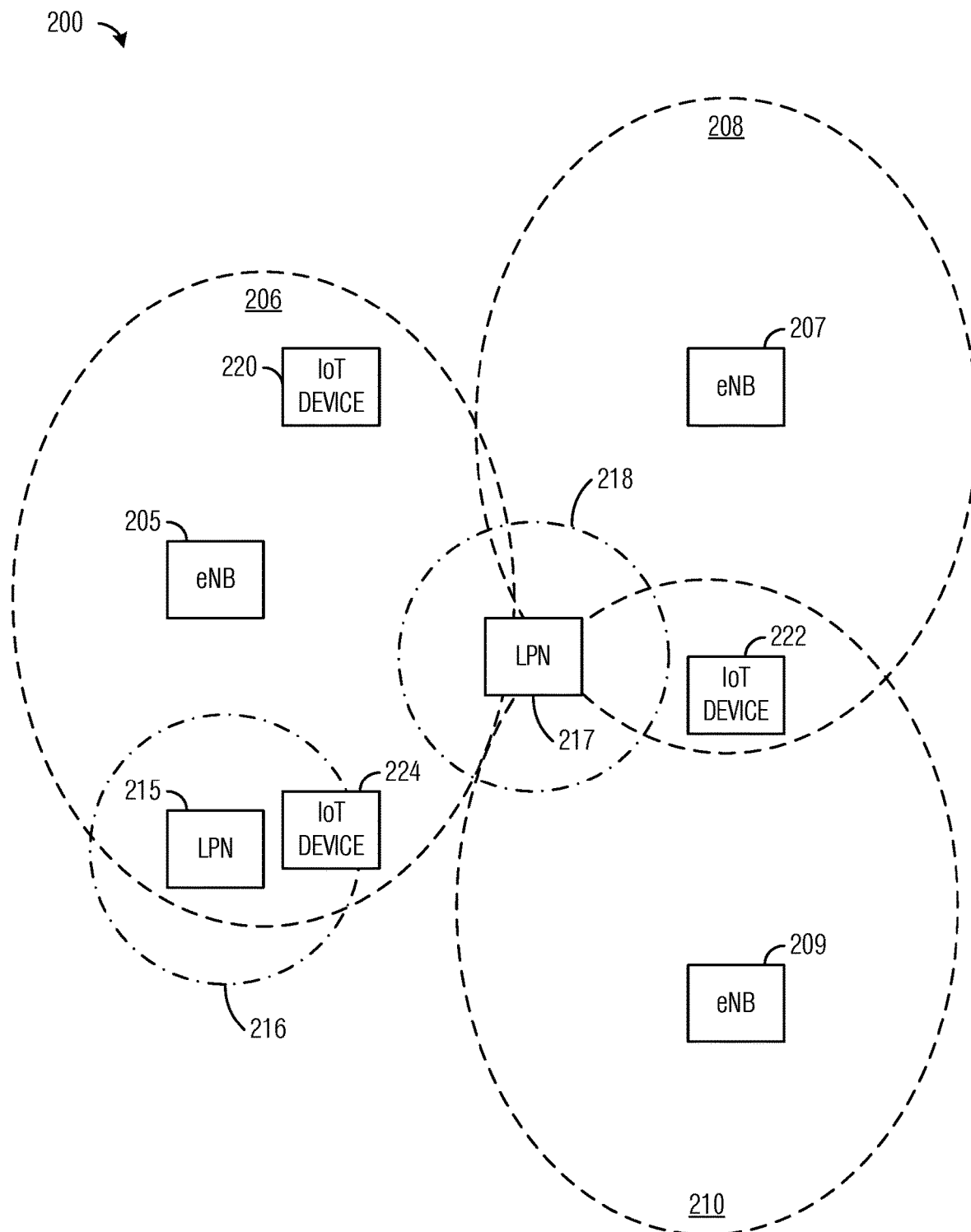
FIG. 2 illustrates an example IoT communications system implemented using a heterogeneous network (HetNet)

FIG. 2 illustrates an example IoT communications system 200 implemented using a heterogeneous network (HetNet). The HetNet includes a planned network infrastructure, such as a 3GPP LTE compliant communications network, or any other standards or non-standards compliant communications network wherein communications take place through entities that are deployed in a structured fashion. As shown in FIG. 2, the planned network infrastructure includes a plurality of evolved NodeBs (eNBs), including eNB 205 with coverage area 206, eNB 207 with coverage area 208, and eNB 209 with coverage area 210. The HetNet also includes an unplanned network infrastructure. The unplanned network infrastructure may include low powered nodes (LPNs) that are deployed by an operator of the HetNet or by users of the HetNet to help improve coverage and/or overall communications system performance. The unplanned network infrastructure shown in FIG. 2 includes a plurality of LPNs, including LPN 215 with coverage area 216 and LPN 217 with coverage area 218. As their name implies, the LPNs usually transmit at a lower power level than the eNBs of the planned network infrastructure. eNBs and LPNs may be referred to as cells or transmission points.

The HetNet serves IoT devices, such as IoT device 220, IoT device 222, and IoT device 224, that are either mobile or immobile. The capabilities of the IoT devices may vary widely. As an example, if the IoT device is a smart device, such as a smart telephone, the IoT device may be capable of simultaneously communicating with multiple services, display multimedia, create multimedia, participate in an interactive session, serve data, and so on. As another example, if the IoT device is a sensor, such as a security sensor or a weather temperature, the IoT device may be limited to periodically report its sensory reading to a data aggregator. Regardless of the capabilities of the IoT devices, the IoT devices need to be able to establish a connection with the communications infrastructure (e.g., the HetNet in FIG. 2).

eNBs are also commonly referred to as NodeBs, base stations, communications controllers, access points, and so on, depending on the type of the planned network infrastructure. IoT devices are also commonly referred to as user equipments (UEs), mobile stations, mobiles, terminals, users, subscribers, stations, devices, smart devices, and so on, depending on the type of the IoT devices.

While it is understood that HetNets may employ multiple eNBs capable of communicating with a number of IoT devices, only three eNBs, two LPNs, and three IoT devices are illustrated for simplicity.

As discussed previously, a random access procedure is performed by a UE when it initially attaches to a communications system or when it participates in a handover between cells. The UE participates in the random access procedure with an entity (e.g., an eNB, a LPN, and so on) of the communications system or cell. In a Third Generation Partnership Project (3GPP) Long Term Evolution (LTE) compliant communications system, a random access procedure typically entails the UE selecting and transmitting one out of a plurality of random access preambles to the eNB (an example of an entity of the communications system as described above) and the eNB assigns network resources to the UE to allow the UE to make a connection request. If the random access procedure fails, the UE must wait a certain amount of time before the UE can try again. The amount of time that the UE waits is referred to as a backoff (BO).

Figure 3:
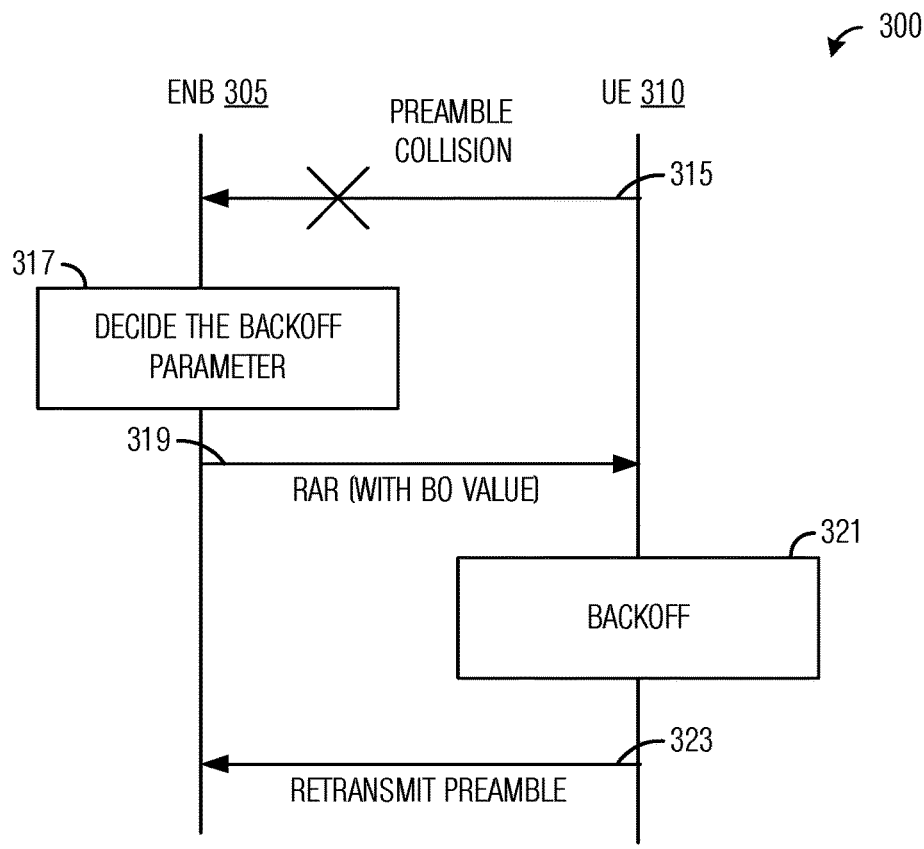
FIG. 3 illustrates an example random access procedure.

FIG. 3 illustrates an example random access procedure 300. Random access procedure 300 involves processing performed by and transmissions made by an eNB 305 and a UE 310. Part of random access procedure 300 includes UE 310 selecting a random access preamble and transmitting the random access preamble to eNB 305. However, in situations when more than one UE is participating in a random access procedure, there is a non-zero probability that another UE will select the same random access preamble. When multiple UEs transmit the same random access preamble, a preamble collision occurs (event 315). eNB 305 determines a backoff (BO) parameter (block 317) and transmits a random access response (RAR) with the backoff parameter to UE 310 (event 319). UE 310 performs a backoff in accordance with the BO parameter provided by eNB 305 (block 321). Once the backoff completes, UE 310 transmits the random access parameter (event 323).

The RACH backoff mechanism used in 3GPP LTE is introduced in 3GPP LTE Release-13 and is based on media access control (MAC) backoff indication (BI). Limited changes to the backoff mechanism, such as a reduction in MAC BI size from 4 bits to another value and corresponding changes to backoff range can be considered if needed and time permits. The UE randomly and uniformly chooses the backoff time from interval [0, backoff parameter value]. The interval [0, backoff parameter value] is also referred to as the backoff window. The backoff parameter value is signaled in the form of an index into a table of backoff parameter values. Table 1 shows Table 7.2-1, backoff parameter values from 3GPP TS 36.321 and Table 2 shows 3GPP LTE Physical Random Access Channel (PRACH) preamble durations.

TABLE 1

3GPP TS 36.321 Table 7.2-1 backoff parameter values.

| Index | Backoff Parameter value (ms) |
|---|---|
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | Reserved |
| 14 | Reserved |
| 15 | Reserved |

TABLE 2

3GPP LTE PRACH preamble durations.

| Preamble format | Duration (ms) | CP duration (us) | Guard time duration (us) |
|---|---|---|---|
| 0 | 1 | 103.3 | 96.88 |
| 1 | 2 | 684.38 | 515.63 |
| 2 | 2 | 203.13 | 196.88 |
| 3 | 3 | 684.38 | 715.63 |

In a narrow-band IoT (NB-IoT) ad hoc meeting and a RAN1 #84 meeting, the following items were agreed upon:

An NB-PRACH scheme based on single-tone transmissions with 3.75 kHz subcarrier spacing is to be used in NB-IoT;

Each transmission consists of 4 groups with each group comprising 1 cyclic prefix (CP) and 5 symbols in a symbol group; and 1, 2, 4, 8, 16, 32, 64, and 128 NB-PRACH repetitions are provided, with an eNB being able to configure up to 3 NB-PRACH repetitions from the 8 provided repetitions. Table 3 shows possible preamble durations based on the 8 provided repetitions.

TABLE 3

Possible preamble durations.

| | Number of repetitions | | | | | | | |
|---|---|---|---|---|---|---|---|---|
| | 1 | 2 | 4 | 8 | 16 | 32 | 64 | 128 |
| Preamble length with 266.7 us CP (ms) | 6.4 = 1.6*4 | 12.8 | 25.6 | 51.2 | 102.4 | 204.8 | 409.6 | 819.2 |

TABLE 3-continued

Possible preamble durations.

| | Number of repetitions | | | | | | |
|---|---|---|---|---|---|---|---|
| | 1 | 2 | 4 | 8 | 16 | 32 | 64 | 128 |
| Preamble length with 66.7 us CP (ms) | 5.6 = 1.4*4 | 11.2 | 22.4 | 44.8 | 89.6 | 179.2 | 358.4 | 716.8 |

However, these backoff parameter values and backoff time are not matched with NB-IoT preamble durations anymore. It can be seen that with repetitions, NB-IoT PRACH preamble duration is even longer than some of the backoff parameter in Table 1, hence some small values make no sense compared with longer preamble duration. For example, the backoff parameter value with toms is no use for preambles with more than one repetition.

Figure 4:
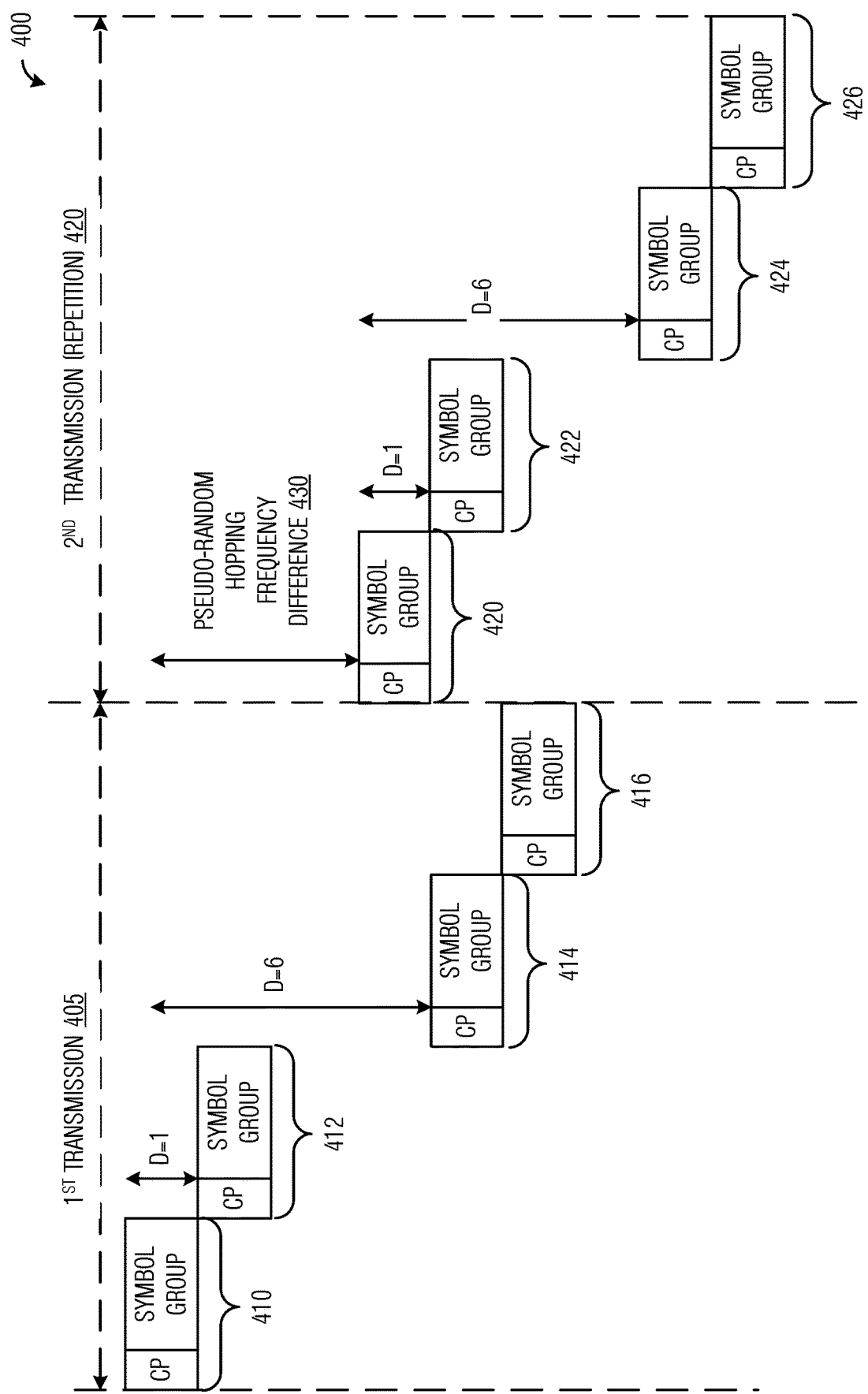
FIG. 4 illustrates a time-frequency diagram of a NB-PRACH transmission with 2 repetitions.

FIG. 4 illustrates a time-frequency diagram 400 of a NB-PRACH transmission with 2 repetitions. As discussed previously, each NB-PRACH transmission consists of 4 groups with each group comprising 1 CP and a symbol group with 5 symbols. As an illustrative example, a first NB-PRACH transmission 405 includes 4 groups 410-416. As shown in FIG. 4, a second NB-PRACH transmission 420 also includes 4 groups (420-426) with each group comprising 1 CP and a symbol group with 5 symbols. Additionally, pseudorandom frequency hopping is implemented between NB-PRACH transmissions, which is shown in FIG. 4 as frequency difference 430 between first NB-PRACH transmission 405 and second NB-PRACH transmission 420. However, the frequency resource usage within each NB-PRACH transmission remains consistent between repetitions.

It is noted that compared to the 3GPP LTE PRACH preamble, the NB-PRACH preamble duration can be much longer, especially in situations when a large number of repetitions are transmitted for the purpose of coverage enhancement. Furthermore, there is also a much wider variation in NB-PRACH length. In some circumstances, e.g., with larger repetition values, the NB-PRACH preamble duration is even longer than some of the backoff parameter values currently used in 3GPP LTE. Hence, some of the smaller backoff parameter values do not make practical sense when compared with larger NB-PRACH preamble durations. As an illustrative example, a backoff parameter value of 10 ms is not useful for NB-PRACH preambles with more than 1 repetition. The randomly selected backoff time does not match current NB-PRACH preamble durations. As another illustrative example, according to the 3GPP LTE backoff parameter values, if a cell load is not heavy and a backoff parameter value is selected as 10 ms, but a random access preamble has a duration of 25.6 ms (without gap time (GT)), the random access preamble will cause interference. As used herein a gap time means a time duration when no signals are transmitted. In a situation when inserted between a Physical Uplink Shared Channel (PUSCH) and a PRACH in the time domain, a gap time is the same as a guard time.

Figure 5A:
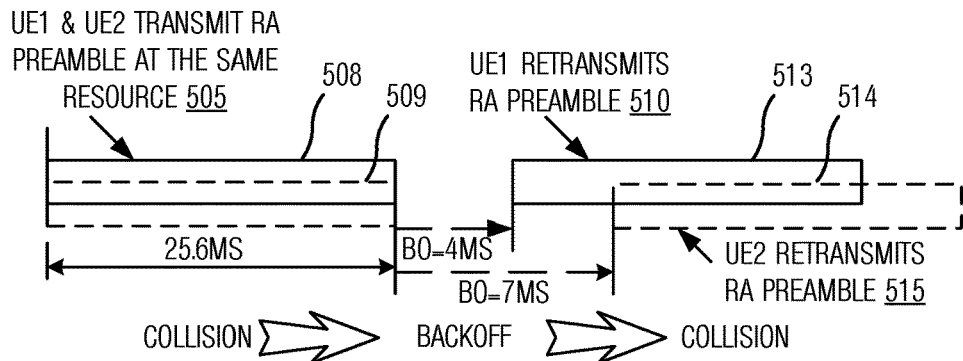
FIG. 5A illustrates a time-frequency diagram illustrating a collision arising from an insufficiently small backoff parameter value.

FIG. 5A illustrates a time-frequency diagram 500 illustrating a collision arising from an insufficiently small backoff parameter value. Collisions among RA preamble transmissions may happen due to the mismatched backoff time and preamble durations. For discussion purposes, the situation illustrated in FIG. 5A involves NB-PRACH preamble durations of 25.6 ms and a backoff parameter value of toms.

At event 505, a first UE (UE1) and a second UE (UE2) transmit NB-PRACH preambles (preamble 508 for UE1 and preamble 509 for UE2) at the same network resource, resulting in a preamble collision. Both UEs randomly select backoff times of 4 ms (for UE1) and 7 ms (for UE2), respectively. Therefore, after a backoff of 4 ms, UE1 retransmits its NB-PRACH preamble (preamble 513) (event 510) and after a backoff of 7 ms, UE2 retransmits its NB-PRACH preamble (preamble 514) (event 515). However, because the NB-PRACH preambles are 25.6 ms long, UE1 is unable to complete the transmission of its NB-PRACH preamble 513 before UE2 transmits its NB-PRACH preamble 514 and another preamble collision takes place.

Using the current backoff mechanism, the collision probability for long preamble durations and short preamble durations differ greatly due to the wide range of preamble lengths. As an illustrative example, under the same cell load conditions and if the backoff parameter value is set to 960 ms, UEs using short preamble durations (e.g., 12.8 ms) will have many more opportunities for access with low collision probability, but UEs using long preamble durations (e.g., 819.2 ms) will have less opportunities for access with high collision probability. Additionally, due the narrow band nature of NB-IoT, long preamble durations may block and cause extra delay in NB PUSCH (NB-PUSCH) transmission. The allocation of network resources may need to be changed to reduce the blocking issue.

Figure 5B:
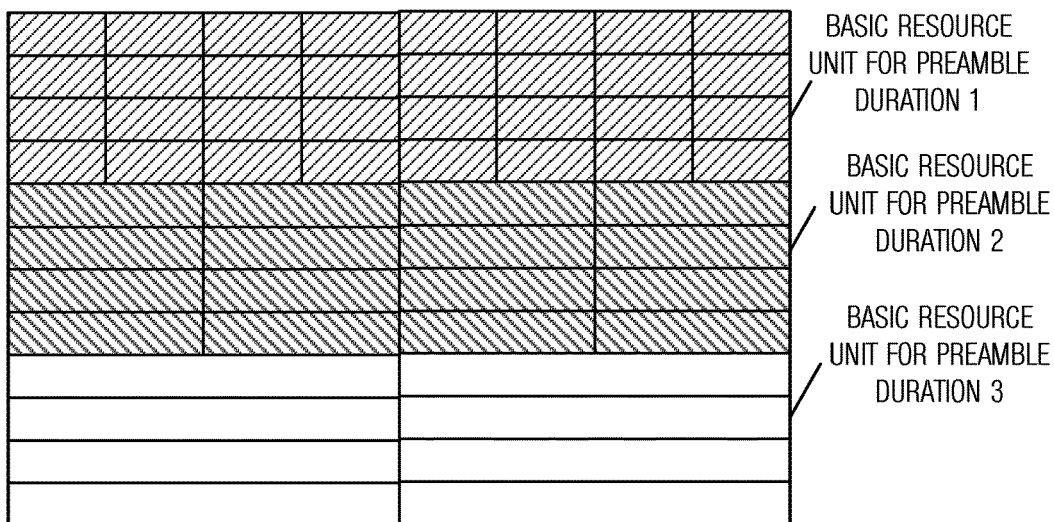
FIG. 5B illustrates a diagram of network resources highlighting different collision probabilities.

FIG. 5B illustrates a diagram 550 of network resources highlighting different collision probabilities. Due to wide range of preamble length, given same resource unit, the collision probabilities for long preamble duration and short preamble duration differ significantly. Diagram 550 displays three kinds of random access preamble durations, where each has been allocated resources of the same size. With the legacy mechanism, for the same cell load, if the backoff window is fixed as a large one like 960 ms, for UEs with short preamble duration like 12.8 ms preamble duration, they have more opportunities to access hence they may have low collision probability; while for UEs with long preamble duration like 819.2 ms preamble duration, they have less opportunities and high collision probability. It is noted that collision and interference may still happen after backing off, since NB-PRACH preamble duration becomes much longer than some of the backoff parameter value defined for LTE, especially with large number of repetitions; the NB-PRACH preamble lengths vary widely and the collision probabilities may be different for different preamble lengths in some cases.

According to an example embodiment, the backoff parameter values are defined as multiples of random access preamble durations (random access preamble units) to align the backoff time with preamble duration. Instead of defining the backoff parameter values in time values, which results in widely varying access opportunities and collision probability with different random access preamble durations, the defining of the backoff parameter values as multiple of random access preamble units allows the access opportunities and collision probability to remain substantially constant with different random access preamble durations. Example embodiments include:

Example embodiment 1: The same set of backoff parameter values is used for different random access preamble durations;

Example embodiment 2: Different sets of backoff parameter values are used for different random access preamble durations or repetitions;

Example embodiment 3: Backoff parameter values and frequency hopping are combined to increase access opportunities and decrease collision probabilities. It is noted that frequency hopping may be performed within the same NB-PRACH band or physical resource block (PRB) or in different NB-PRACH bands or PRBs; and Example embodiment 4: A multi-step backoff is performed, Step 1—Backoff in number of a period, and Step 2—Random offset within a period.

Detailed discussion of these example embodiments are provided below.

According to an example embodiment, an eNB determines the backoff parameter values according to the load on corresponding random access channels. A technical standard or an operator of the communications system may define possible backoff parameter values, such as a table of possible backoff parameter values. However, an eNB selects the actual backoff parameter value(s) to signal to the UEs based on the load on the random access channels.

According to an example embodiment, network resource allocation is performed semi-statically to allocate the network resources for NB-PRACH based on random access load. Different numbers of network resources may be allocated for different NB-PRACH channels, with each random access channel being related to one NB-PRACH preamble format (e.g., duration, repetition, and so on). In order to reduce latency to the NB-PUSCH, long random access preambles may be split into multiple parts.

According to example embodiment 1, the backoff parameter values are specified as multiples of random access preamble units and the same backoff parameter values are used for different random access parameter durations. The backoff window of a UE is defined as the product of the backoff parameter value and the random access preamble unit, where the random access preamble unit is equal to the random access preamble duration for the UE. Therefore, the random access window differs for different UEs with different random access preamble durations. The use of the same backoff parameter values for different random access preamble durations is very simple with unified parameters. However, in situations with heavy loads, the latency for long random access preamble durations may be very large. The backoff parameter values may be defined by a technical standard or by an operator of the communications system. Table 4 shows an example backoff parameter value table. Table 5 shows example backoff parameter values in ms and multiples of preamble durations.

TABLE 4

Example backoff parameter values.

| Index | Backoff parameter values (number of preamble durations) |
|---|---|
| 0 | 0 |
| 1 | 4 |
| 2 | 8 |
| 3 | 12 |
| ... | ... |
| N | 4N |

TABLE 5

Example backoff parameter values in ms and multiples of preamble durations.

| Index | Backoff parameter value (ms) | Backoff parameter value (multiples of preamble durations) |
|---|---|---|
| 0 | 0 | 0 |
| 1 | 256 | 40 |
| 2 | 512 | 80 |
| 3 | 1024 | 160 |
| 4 | 2048 | 320 |
| 5 | 4096 | 640 |
| 6 | 8192 | 1280 |
| 7 | 16384 | 2560 |
| 8 | 32768 | 5120 |
| 9 | 65536 | 10240 |
| 10 | 131072 | 20480 |
| 11 | 262144 | 40960 |
| 12 | 524288 | 81920 |
| 13 | Reserved | Reserved |
| 14 | Reserved | Reserved |
| 15 | Reserved | Reserved |

The backoff window may be used in a manner same to the backoff window in 3GPP LTE compliant communications systems, the UE randomly selects a time from within the backoff window and the UE waits the time expires before retransmitting its NB-PRACH preamble.

Figure 6:
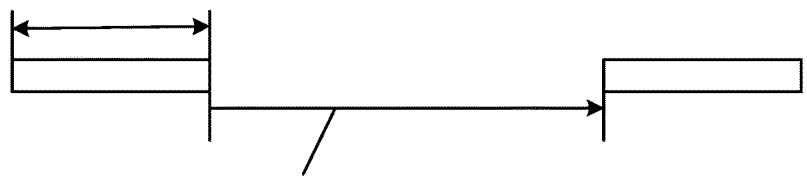
FIG. 6 illustrates an example backoff window that is 2 times the random access preamble unit in duration according to example embodiments disclosed herein.

The backoff window may be used in a manner similar to the backoff window in 3GPP LTE compliant communications systems, the UE randomly selects a number from within the backoff window and the UE waits the number times the random access preamble unit before retransmitting its NB-PRACH preamble. FIG. 6 illustrates an example backoff window 600 that is 2 times the random access preamble unit in duration. Table 6 shows example backoff times for two UEs with different random access preamble units.

TABLE 6

Example backoff times for two UEs with different random access preamble units.

| Preamble duration (without GT) | Backoff value selected by UE | Backoff time |
|---|---|---|
| UE1: 12.8 ms | 2 | 25.6 ms |
| UE2: 25.6 ms | 3 | 76.8 ms |

According to example embodiment 2, backoff parameter values are specified as multiples of random access preamble units and different sets of backoff parameter values are used for different random access preamble repetitions. The use of different sets of backoff preamble values for different random access preamble repetitions enable the adjustment of different backoff window sizes for different random access preamble durations. As an example, long random access preamble durations are assigned a set of backoff parameter values with small values, while short random access preamble durations are assigned a set of backoff parameter values with large values. FIG. 7 illustrates a table 700 of example backoff parameter values with different sets of backoff parameter values assigned to different random access preamble durations. As shown in FIG. 7, a first backoff parameter set 705 comprising smaller backoff parameter values are assigned to high random access preamble repetitions, a second backoff parameter set 710 comprising medium backoff parameter values are assigned to medium random access preamble repetitions, and a third backoff parameter set 715 comprising a wide range of backoff parameter values are assigned to low random access preamble repetitions.

According to example embodiment 3, backoff parameter values are specified as multiples of random access preamble units and a combination of backoff window size and frequency hopping based on the number of random access preamble repetitions is used. As an illustrative example, a non-zero backoff window size and frequency hopping are used in situations with small numbers of random access preamble repetitions. As another illustrative example, backoff windows are not used but frequency hopping is used in situations with large numbers of random access preamble repetitions.

Figure 8B:
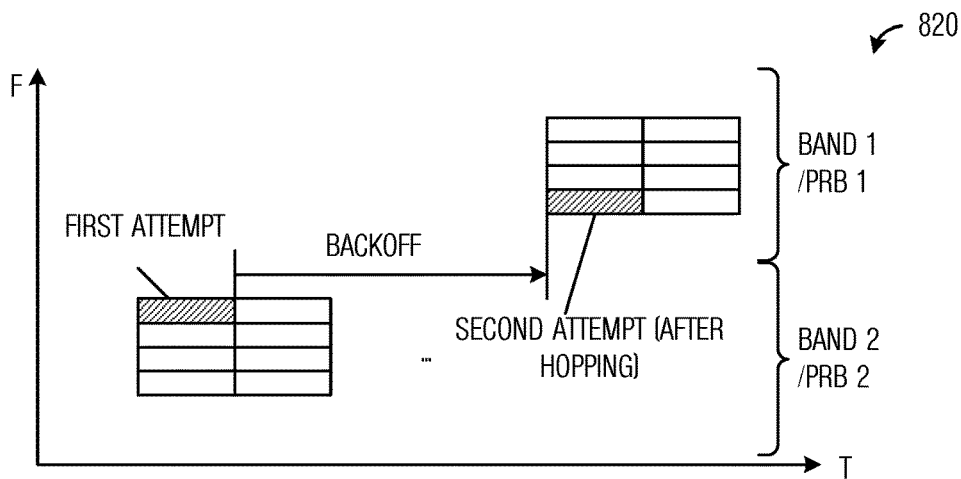
FIG. 8B illustrates a time-frequency graph highlighting second example NB-PRACH operation in accordance with example embodiment 3.

FIG. 8A illustrates a time-frequency graph Boo highlighting first example NB-PRACH operation in accordance with example embodiment 3. As shown in FIG. 8A, the backoff window is a multiple of the random access preamble duration and the frequency hopping occurs within the same frequency NB-PRACH band or PRB. In NB-IoT, a PRB may contain multiple NB-PRACH bands. FIG. 8B illustrates a time-frequency graph 820 highlighting second example NB-PRACH operation in accordance with example embodiment 3. As shown in FIG. 8B, the backoff window is a multiple of the random access preamble duration and the frequency hopping occurs in a different frequency NB-PRACH band or PRB. The examples shown in FIGS. 8A and 8B may be preferably used in situations with small numbers of random access preamble repetitions.

Figure 8D:
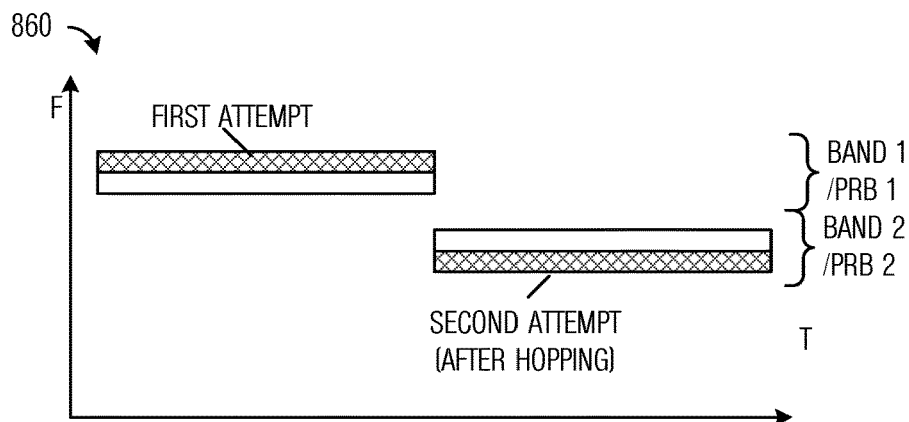
FIG. 8D illustrates a time-frequency graph highlighting fourth example NB-PRACH operation in accordance with example embodiment 3.

FIG. 8C illustrates a time-frequency graph 840 highlighting third example NB-PRACH operation in accordance with example embodiment 3. As shown in FIG. 8C, the backoff window is of duration zero (i.e., there is no backoff) and the frequency hopping occurs within the same frequency NB-PRACH band or PRB. FIG. 8D illustrates a time-frequency graph 860 highlighting fourth example NB-PRACH operation in accordance with example embodiment 3. As shown in FIG. 8D, the backoff window is of duration zero and the frequency hopping occurs in a different frequency NB-PRACH band or PRB. The examples shown in FIGS. 8C and 8D may be preferably used in situations with large numbers of random access preamble repetitions.

According to example embodiment 4, backoff parameter values are specified as multiples of random access preamble units and a multi-step backoff is performed. As an illustrative example, in a situation wherein NB-PRACH resources are periodically allocated with each period including a number of time-frequency resources allocated for random access preamble transmission, a two-step backoff includes: in a first step, backoff is performed in steps of a predefined period (the period and steps of the period are determined by the eNB or UE); and in a second step, a random offset within the period is selected (the random offset is determined by the UE). Frequency hopping can also be utilized.

Figure 9A:
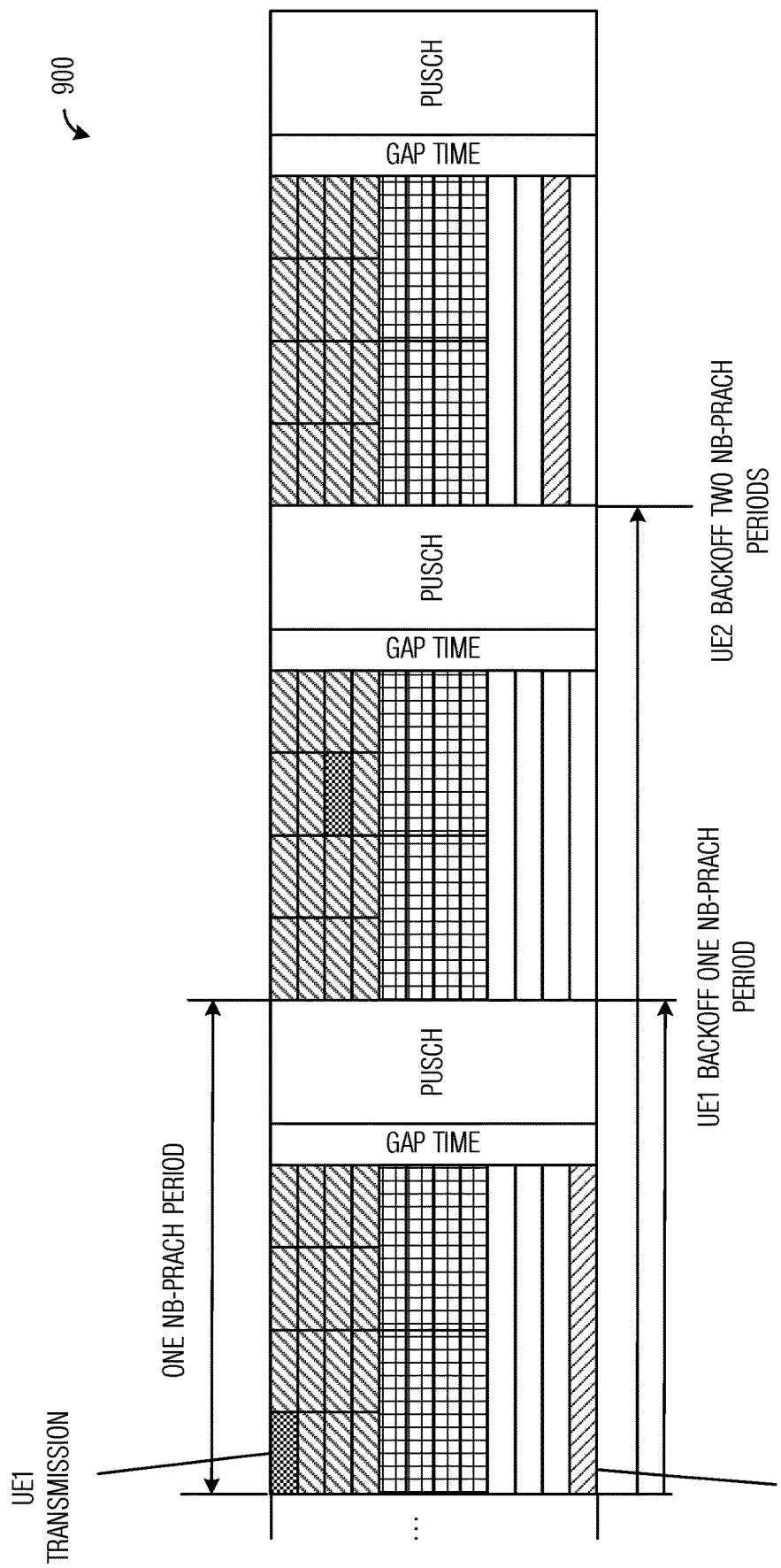
FIG. 9A illustrates a first time-frequency graph highlighting a multi-step backoff in accordance with example embodiment 4.
Figure 9B:
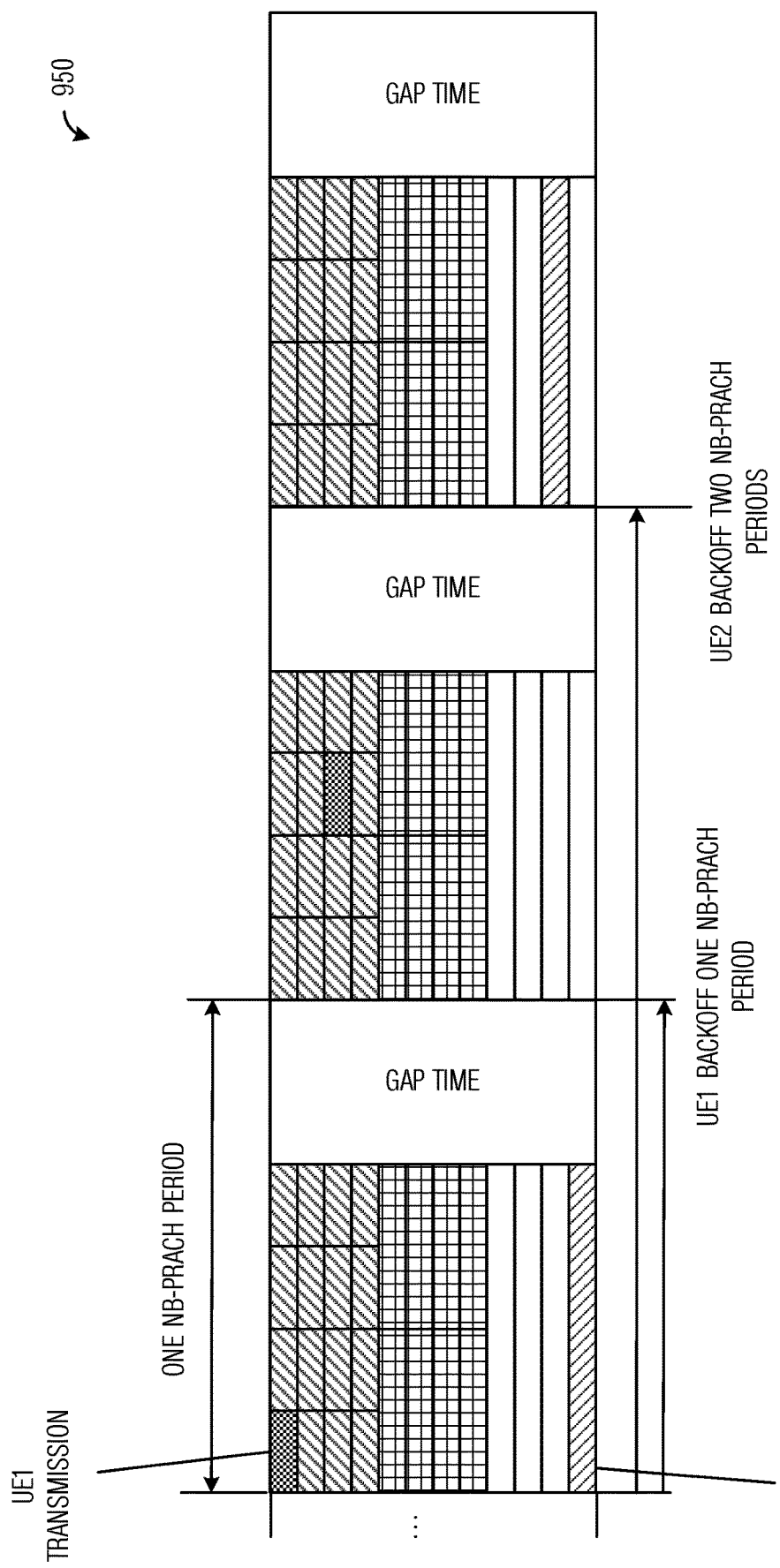
FIG. 9B illustrates a second time-frequency graph highlighting a multi-step backoff in accordance with example embodiment 4.

FIG. 9A illustrates a first time-frequency graph 900 highlighting a multi-step backoff in accordance with example embodiment 4. As shown in FIG. 9, some time-frequency resources are allocated for random access preamble transmission, while others are allocated for PUSCH transmission, gap time, and so on. Different UEs are assigned in different NB-PRACH periods. As an example, UE1 is assigned an NB-PRACH backoff with one period meaning that UE1 can retransmit a NB-PRACH preamble on a UE selected time-frequency resource in the next period, while UE2 is assigned an NB-PRACH backoff with two periods meaning that UE2 can retransmit an NB-PRACH preamble on a UE selected time-frequency resource in the second period following the first transmission. As shown in FIG. 9A, when the random access preamble is shorter, there are more transmission opportunities, therefore the UEs can randomly select an access opportunity for random access preamble transmission, while for longer random access preambles, there are fewer opportunities. FIG. 9B illustrates a second time-frequency graph 950 highlighting a multi-step backoff in accordance with example embodiment 4. As shown in FIG. 9B, no resources are allocated for PUSCH transmission, while others are allocated for random access preamble transmission, gap time, and so on.

In another example embodiment, it is beneficial to align NB-PRACH with 1 millisecond subframe boundary of LTE. In one alternative, different gap time can be inserted in the end of NB-PRACH. Table 7 lists example gap times that may be inserted at the end of a NB-PRACH preamble. The gap times listed in Table 7 are for illustrative purposes. The actual gap time could be different and depends on the intended cell coverage and/or the preamble duration. For example, the gap time for NB-PRACH with 128 repetitions may be 0.8 ms for 266.7 us CP and 0.2 MS for 66.7 us CP, respectively. The gap time may be used for alignment purposes, such as a 1 ms subframe boundary, for example.

TABLE 7

Example gap times.

| | Number of repetitions | | | | | | | |
|---|---|---|---|---|---|---|---|---|
| | 1 | 2 | 4 | 8 | 16 | 32 | 64 | 128 |
| Preamble length with 266.7 us CP (ms) | 6.4 = 1.6*4 | 12.8 | 25.6 | 51.2 | 102.4 | 204.8 | 409.6 | 819.2 |
| Gap time (ms) | 0.6 | 0.2 | 0.4 | 0.8 | 0.6 | 0.2 | 0.4 | 0.8 |
| Preamble length with 66.7 us CP (ms) | 5.6 = 1.4*4 | 11.2 | 22.4 | 44.8 | 89.6 | 179.2 | 358.4 | 716.8 |
| Gap time (ms) | 0.4 | 0.8 | 0.6 | 0.2 | 0.4 | 0.8 | 0.6 | 0.2 |

In another alternative example embodiment, multiple NB-PRACH resources can be multiplexed in TDM. Each resource is dedicated to one type of NB-PRACH with the same preamble duration. Multiple allocated NB-PRACH durations are aggregated in time and followed by a gap time to align the whole PRACH resource to 1 ms subframe boundary.

In another alternative example embodiment, multiple NB-PRACH resources can be multiplexed in TDM. Each resource is dedicated to one type of NB-PRACH with the same preamble duration. Multiple allocated NB-PRACH durations are aggregated in time to align the whole PRACH resource to 1 ms subframe boundary. In this case, there is no gap time after PRACH. For example, 5 preambles with duration 6.4 ms can align with 1 ms subframe boundary.

According to an example embodiment, an eNB allocates the time-frequency resources for NB-PRACH based on the random access load. The eNB may make use of the system information block (SIB) to signal the allocations. As an illustrative example, the eNB may allocate different numbers of time-frequency resources for different random access channels, with each random access channel being related to a random access preamble format. The random access channels (i.e., the allocated time-frequency resources) may be time division multiplexed (TDM) and/or frequency division multiplexed (FDM) within one NB-PRACH band or PRB. Alternatively, the random access channels may be allocated in different NB-PRACH bands or PRBs. The load may be distributed on a random access channel basis rather than cell basis. When the load is high, more time-frequency resources may be allocated.

Figure 10A:
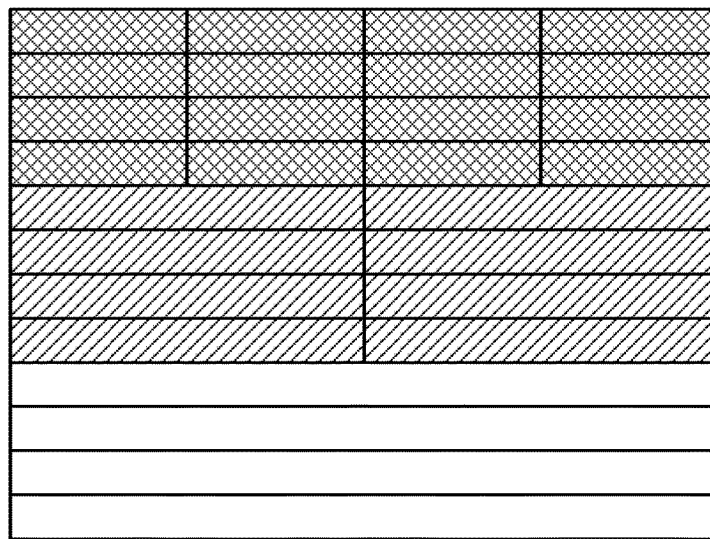
FIGS. 10A and 10B illustrate example allocations of time-frequency resources to random access channels according to example embodiments disclosed herein.
Figure 10B:
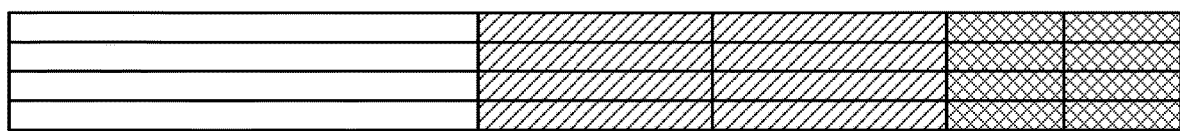

FIGS. 10A and 10B illustrate example allocations of time-frequency resources to random access channels. FIG. 10A illustrates an example allocation 1000 of time-frequency resources to random access channels in a FDM manner. FIG. 10B illustrates an example allocation 1010 of time-frequency resources to random access channels in a TDM manner.

According to an example embodiment, the time-frequency resources allocated for random access channels are multiplexed with time-frequency resources allocated for NB-PUSCH. The multiplexing of the NB-PUSCH and the random access channels may help to reduce the latency of the NB-PUSCH cause by long NB-PRACH preambles.

According to an example embodiment, multiple bands or PRBs are used in multiplexing the NB-PRACH and the NB-PUSCH. FIG. 11A illustrates a diagram 1100 of two bands or PRBs used for multiplexing channels of the same coverage level. In a situation where the NB-PUSCH and the NB-PRACH are of the same coverage level (i.e., they have the same preamble duration), the channels are multiplexed into the same band or PRB, using TDM, for example. FIG. 11B illustrates a diagram 1120 of two bands or PRBs when at least one of the bands or PRBs has unused resources. In a situation where there are unused resources in one or more bands or PRBs, the NB-PUSCH can be allocated the unused resources. FIG. 11C illustrates a diagram 1140 of two bands or PRBs highlighting priority based allocation. In a situation with mixed multiplexing, the allocation of the resources may be made in accordance with the priority of the preambles. As an example, long preambles have higher priority than short preambles. FIG. 11D illustrates a diagram 1160 of two bands or PRBs with separate band or PRB allocation. The NB-PUSCH and the NB-PRACH may be allocated to separate bands or PRBs. If more than 2 bands or PRBs are available, each of the NB-PUSCH or the NB-PRACH may be allocated more than 1 band or PRB.

Figure 12:
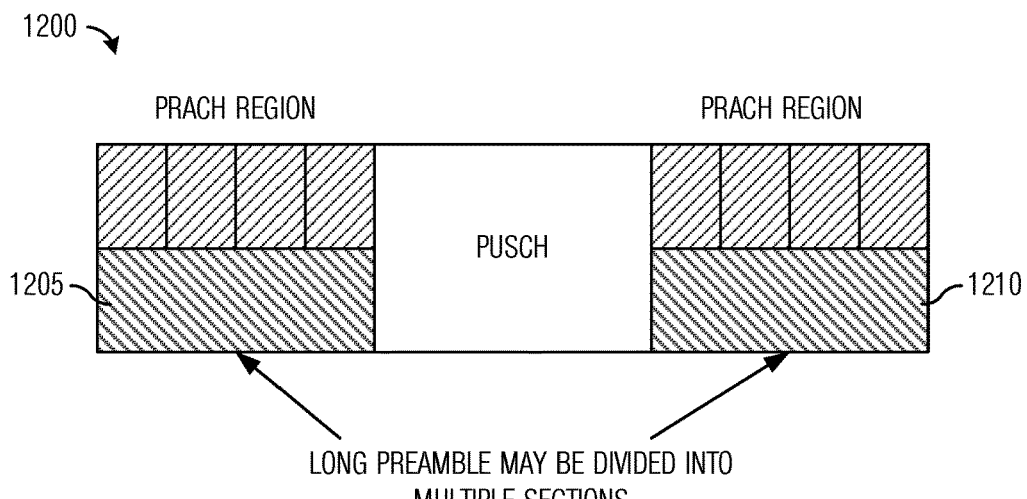
FIG. 12 illustrates a time-frequency diagram highlighting the splitting of a long random access preamble into shorter parts according to example embodiments disclosed herein.

According to an example embodiment, long random access preambles (preambles with long durations) are split into multiple parts. Each part may be separately scheduled and transmitted. Reducing the duration of the random access preambles reduces the latency on the NB-PUSCH since the network resources are not allocated for extended amounts of time. Each of the shorter parts may utilize the backoff parameter values assigned to a whole random access preamble of the same duration as the shorter part. FIG. 12 illustrates a time-frequency diagram 1200 highlighting the splitting of a long random access preamble into shorter parts. As shown in diagram 1200, a long random access preamble is split into 2 parts and is transmitted in resource 1205 and resource 1210. It is noted that in order to align the boundaries (e.g., 2 ms slot or 4 ms subframe boundary), gap time may be inserted after a random access preamble.

FIG. 13 illustrates a flow diagram of example operations 1300 occurring in a UE participating in a random access procedure. Operations 1300 may be indicative of operations occurring in a UE as the UE participates in a random access procedure.

Operations 1300 begin with the UE determining that the random access procedure has failed (block 1305). The random access procedure has failed if the eNB does not send a random access response to a random access preamble sent by the UE, for example. Alternatively, the random access procedure has failed if the UE receives a random access response from the eNB, but the random access response is not for the UE but another UE that sent the same random access preamble. The UE selects a backoff time from a backoff window ranging from [0, random access parameter value*random access preamble unit] (block 1310). The random access parameter value is signaled by the eNB. As an illustrative example, the eNB signals an indicator of which random access parameter value to use out of a table of random access parameter values specified by a technical standard or an operator of the communications system. The UE waits until the backoff time expires (block 1315). When the backoff time expires, the UE retransmits the random access preamble (block 1320). In some example embodiments, the random access preamble is segmented into a plurality of blocks and the UE transmits each of the plurality of blocks. In some example embodiments, the UE interleaves a PUSCH with at least some of the blocks.

In a first aspect, the present application provides a method for performing a random access procedure. The method includes randomly selecting, by a UE, a backoff time from within a backoff window ranging from 0 to a specified multiple of a random access preamble unit, waiting, by the UE, until a time initialized with the backoff time expires, and retransmitting, by the UE, a random access preamble.

According to a first embodiment of the method according to the first aspect, the specified multiple is one of a plurality of specified multiples, and different specified multiples are selected for random access preambles with different durations. According to a second embodiment of the method according to any preceding embodiment of the first aspect or the first aspect as such, there is a plurality of sets of specified multiples, and the specified multiple is selected from one of the plurality of sets of specified multiples in accordance with a duration of the random access preamble. According to a third embodiment of the method according to any preceding embodiment of the first aspect or the first aspect as such, the random access preamble is initially transmitted on one of a first carrier or a first band, and the random access preamble is retransmitted on one of a second carrier or a second band. According to a fourth embodiment of the method according to any preceding embodiment of the first aspect or the first aspect as such, randomly selecting the backoff time includes selecting an initial backoff time within a step of a predefined period, and selecting the backoff time within the initial backoff time. According to a fifth embodiment of the method according to any preceding embodiment of the first aspect or the first aspect as such, the method also includes segmenting the random access preamble into a plurality of blocks, where retransmitting the random access preamble includes separately transmitting each of the plurality of blocks. According to a sixth embodiment of the method according to any preceding embodiment of the first aspect or the first aspect as such, separately transmitting each of the plurality of blocks includes interleaving at least some of the plurality of blocks with an uplink data channel. According to a seventh embodiment of the method according to any preceding embodiment of the first aspect or the first aspect as such, the random access preamble is transmitted in a network resource, and the network resource also includes a gap inserted after the network resource so that a duration of the network resource and a gap time associated with the gap is equal to an integer multiple of a subframe duration.

In a second aspect, the present application provides a method for transmitting a random access procedure. The method includes generating, by a UE, the random access preamble, and when a number of physical random access channel (PRACH) repetitions per attempt is larger than a threshold, segmenting, by the UE, the random access preamble into a plurality of blocks, and separately transmitting, by the UE, each of the plurality of blocks.

According to a first embodiment of the method according to the second aspect, separately transmitting each of the plurality of blocks includes interleaving at least some of the plurality of blocks with an uplink data channel.

FIG. 14 illustrates a flow diagram of example operations 1400 occurring in an eNB participating in a random access procedure. Operations 1400 may be indicative of operations occurring in an eNB as the eNB participates in a random access procedure.

Operations 1400 begin with the eNB determining a backoff parameter value (block 1405). The backoff parameter value is specified as a multiple of a random access preamble unit (e.g., a random access preamble duration) of the UE. As an illustrative example, the same set of backoff parameter values is used for all random access preamble units. As another illustrative example, different sets of backoff parameter values are used for different random access preamble durations. As yet another illustrative example, in addition to backoff parameter values based on random access parameter units, frequency hopping is also used. As yet another illustrative example, a multi-step backoff is used, where a period for backoff is specified and an offset within the period is either specified or is selectable by the UE. The eNB signals the backoff parameter value or an indicator thereof to the UE (block 1410). The eNB receives a random access preamble in accordance with the backoff parameter value (block 1415).

In a third aspect, the present application provides a method for performing a random access procedure. The method includes determining, by an eNB, a backoff parameter value in accordance with a random access preamble unit associated with a UE participating in the random access procedure, signaling, by the eNB, an indicator of the backoff parameter value, and receiving, by the eNB, a random access preamble in accordance with the backoff parameter value.

According to a first embodiment of the method according to the third aspect, the backoff parameter value specifies a multiple of the random access preamble unit. According to a second embodiment of the method according to any preceding embodiment of the third aspect or the third aspect as such, there is a plurality of sets of specified multiples, and the specified multiple is selected from one of the plurality of sets of specified multiples in accordance with a duration of the random access preamble. According to a third embodiment of the method according to any preceding embodiment of the third aspect or the third aspect as such, the method also includes selecting a step of a predefined period, and signaling an indicator of the step of the predefined period.

According to a fourth embodiment of the method according to any preceding embodiment of the third aspect or the third aspect as such, the random access preamble is segmented into a plurality of blocks, and receiving the random access preamble includes separately receiving each of the plurality of blocks. According to a fifth embodiment of the method according to any preceding embodiment of the third aspect or the third aspect as such, the method also includes receiving an uplink data channel interleaved with at least some of the plurality of blocks.

In order to deal with the possible collision problem caused by mismatched backoff parameter values, it is to define the backoff time as multiple times of basic time units, where the unit may equal to a preamble duration. From the RAN1 aspect, a problem is that the preamble duration (without considering GT) is not aligned with the subframe boundary of 1 ms subframe for 15 kHz subcarrier spacing and 4 ms subframe for 3.75 kHz subcarrier spacing, which may increase the scheduling complexity. According to an example embodiment, one solution is to insert gap time. Following are two examples:

Example A: Append a variable length of gap time after the random access preamble to align each random access preamble transmission resource with subframe boundary. As shown above in Table 3, the gaps between random access preamble durations and subframe boundary are different. There may be four kinds of gap time, e.g., {0.2 ms, 0.4 ms, 0.6 ms, 0.8 ms}, which can be used to align the random access preamble with 1 ms subframe boundary. However, some of them will result in unnecessary overhead.

Figure 15:
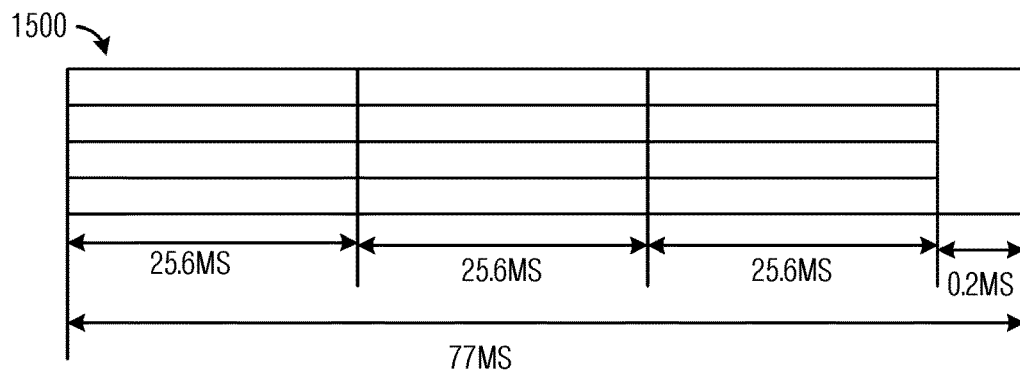
FIG. 15 illustrates a diagram of network resources highlighting the use of a predefined gap time to align a random access preamble transmission with a 1 ms subframe boundary according to example embodiments disclosed herein.

Example B: Append a predefined length of gap time after a bundle of random access preamble transmission resources to align a bundle of random access preamble transmission resources with subframe boundary. This approach is to multiplex the resources for different preamble durations by TDM; a predefined gap time (e.g., 0.2 ms) can be appended after a bundle of random access preamble transmission resources. Hence the accumulated time can be aligned with 1 ms subframe boundary. FIG. 15 illustrates a diagram 1500 of network resources highlighting the use of a predefined gap time to align a random access preamble transmission with a 1 ms subframe boundary.

Figure 16A:
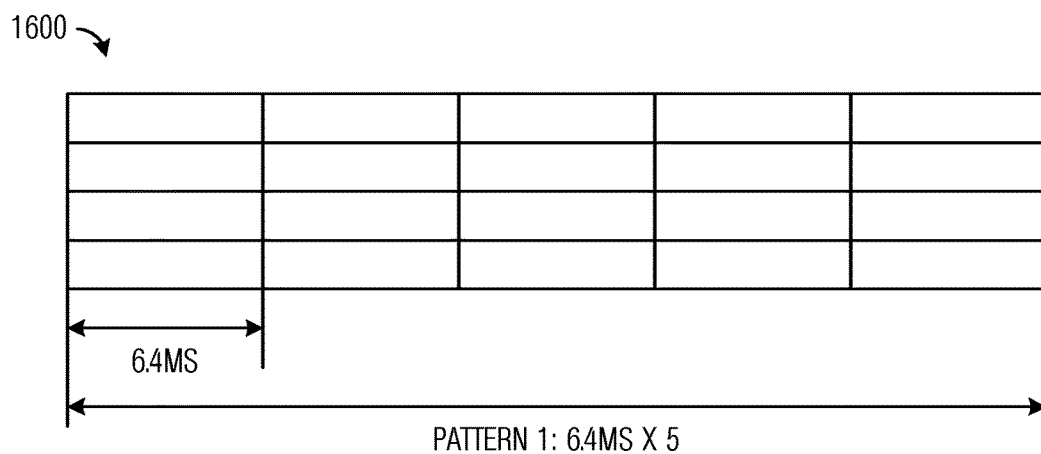
FIG. 16A illustrates a first diagram of network resources highlighting a continuous allocation of network resources according to example embodiments disclosed herein.
Figure 16B:
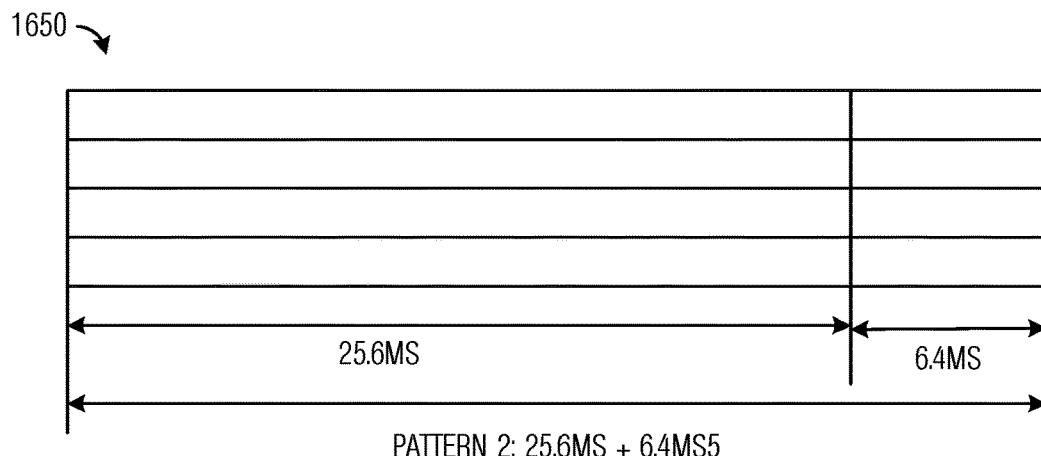
FIG. 16B illustrates a second diagram of network resources highlighting a mixed allocation of network resources according to example embodiments disclosed herein.

According to another example embodiment, one solution is to bundle a plurality of random access preamble transmissions without a gap time and use a resource pattern to schedule the random access preamble transmissions. In this solution, it is assumed that there is a dedicated band for random access transmissions, and eNB won't schedule NB-PUSCH in this band. Hence there is no need for GT. Multiple random access preamble transmission resources corresponding to different preamble durations are multiplexed by TDM. FIG. 16A illustrates a first diagram 1600 of network resources highlighting a continuous allocation of network resources. FIG. 16B illustrates a second diagram 1650 of network resources highlighting a mixed allocation of network resources.

Proposal 1: Consider above solutions to align the PRACH channel with NB-IoT subframe boundaries. To deal with the possible unbalanced collision probability for different PRACH preamble formats, semi-statically resource allocation for PRACH may be adopted. Firstly, a random access channel load indicator can be defined instead of current cell load. This is to say, the load is per random access channel basis. Each random access channel is related to one preamble format. When load is heavy, more resources may be allocated. Consequently, eNB can allocate different number of resources for different random access channels based on random access channel load, in which the resource allocation information may be carried via SIB.

Proposal 2: Consider semi-static resource allocation based on random access channel load to balance the collision probabilities in different random access channels for different preamble formats.

Figure 17:
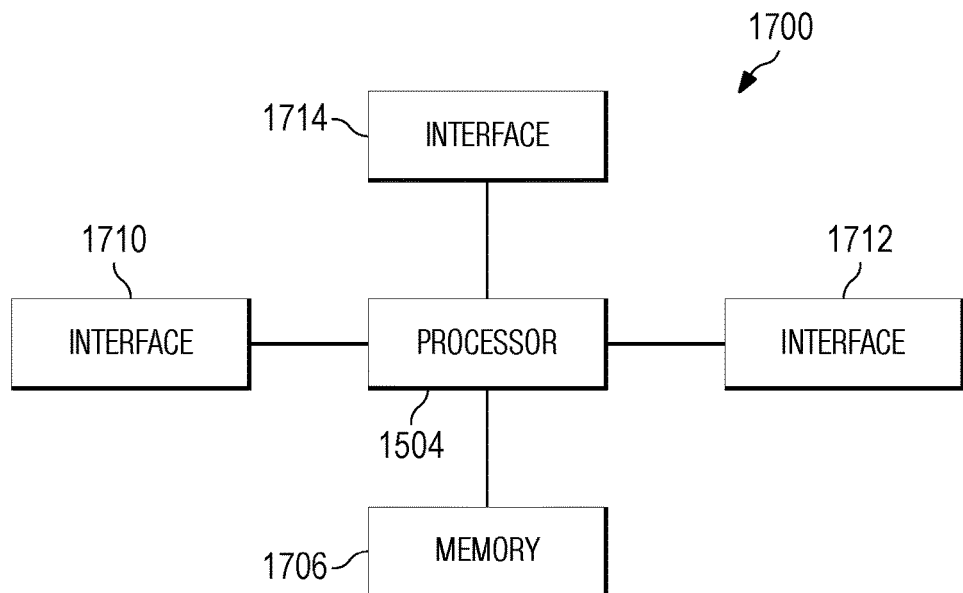
FIG. 17 illustrates a block diagram of an embodiment processing system for performing methods described herein.

FIG. 17 illustrates a block diagram of an embodiment processing system 1700 for performing methods described herein, which may be installed in a host device. As shown, the processing system 1700 includes a processor 1704, a memory 1706, and interfaces 1710-1714, which may (or may not) be arranged as shown in FIG. 17. The processor 1704 may be any component or collection of components adapted to perform computations and/or other processing related tasks, and the memory 1706 may be any component or collection of components adapted to store programming and/or instructions for execution by the processor 1704. In an embodiment, the memory 1706 includes a non-transitory computer readable medium. The interfaces 1710, 1712, 1714 may be any component or collection of components that allow the processing system 1700 to communicate with other devices/components and/or a user. For example, one or more of the interfaces 1710, 1712, 1714 may be adapted to communicate data, control, or management messages from the processor 1704 to applications installed on the host device and/or a remote device. As another example, one or more of the interfaces 1710, 1712, 1714 may be adapted to allow a user or user device (e.g., personal computer (PC), etc.) to interact/communicate with the processing system 1700. The processing system 1700 may include additional components not depicted in FIG. 17, such as long term storage (e.g., non-volatile memory, etc.).

In some embodiments, the processing system 1700 is included in a network device that is accessing, or part otherwise of, a telecommunications network. In one example, the processing system 1700 is in a network-side device in a wireless or wireline telecommunications network, such as a base station, a relay station, a scheduler, a controller, a gateway, a router, an applications server, or any other device in the telecommunications network. In other embodiments, the processing system 1700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 18:
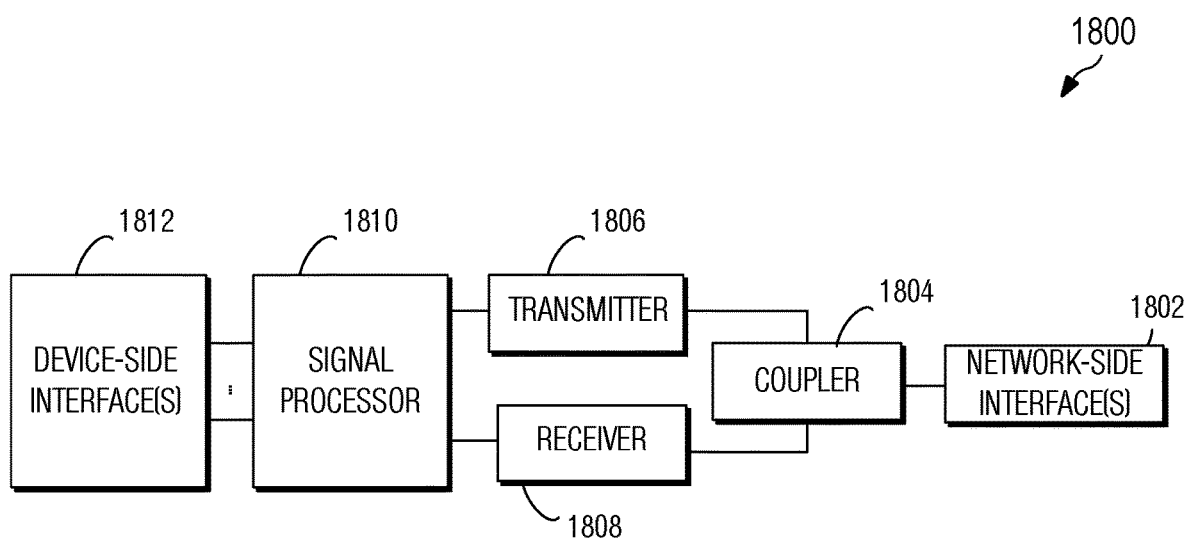
FIG. 18 illustrates a block diagram of a transceiver adapted to transmit and receive signaling over a telecommunications network.

In some embodiments, one or more of the interfaces 1710, 1712, 1714 connects the processing system 1700 to a transceiver adapted to transmit and receive signaling over the telecommunications network. FIG. 18 illustrates a block diagram of a transceiver 1800 adapted to transmit and receive signaling over a telecommunications network. The transceiver 1800 may be installed in a host device. As shown, the transceiver 1800 comprises a network-side interface 1802, a coupler 1804, a transmitter 1806, a receiver 1808, a signal processor 1810, and a device-side interface 1812. The network-side interface 1802 may include any component or collection of components adapted to transmit or receive signaling over a wireless or wireline telecommunications network. The coupler 1804 may include any component or collection of components adapted to facilitate bi-directional communication over the network-side interface 1802. The transmitter 1806 may include any component or collection of components (e.g., up-converter, power amplifier, etc.) adapted to convert a baseband signal into a modulated carrier signal suitable for transmission over the network-side interface 1802. The receiver 1808 may include any component or collection of components (e.g., down-converter, low noise amplifier, etc.) adapted to convert a carrier signal received over the network-side interface 1802 into a baseband signal. The signal processor 1810 may include any component or collection of components adapted to convert a baseband signal into a data signal suitable for communication over the device-side interface(s) 1812, or vice-versa. The device-side interface(s) 1812 may include any component or collection of components adapted to communicate data-signals between the signal processor 1810 and components within the host device (e.g., the processing system 1700, local area network (LAN) ports, etc.).

The transceiver 1800 may transmit and receive signaling over any type of communications medium. In some embodiments, the transceiver 1800 transmits and receives signaling over a wireless medium. For example, the transceiver 1800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1802 comprises one or more antenna/radiating elements. For example, the network-side interface 1802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a selecting unit/module, a waiting unit/module, a determining unit/module, and/or a signaling unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for performing random access, the method comprises:
   receiving, by a user equipment (UE), a backoff indication;
   transmitting, by the UE, a first random access transmission of a random access preamble to initiate a random access procedure;
   determining, by the UE, that reception of a random access response corresponding to the first random access transmission of the random access preamble was not successful;
   selecting, by the UE, a backoff parameter value from a set of backoff parameter values based on the backoff indication, the set of backoff parameter values consisting of multiples of a duration of the random access preamble of the UE; and
   transmitting, by the UE, a second random access transmission upon expiration of a backoff time following the determination that reception of the random access response corresponding to the first random access transmission of the random access preamble was not successful, the backoff time being randomly selected from between zero and the selected backoff parameter value.

2. The method of claim 1, wherein the set of backoff parameter values are stored by the UE.

3. The method of claim 1, wherein the set of backoff parameter values consists of a zero multiple of the duration of the random access preamble and a plurality of non-zero integer multiples of the duration of the random access preamble.

4. The method of claim 3, wherein the set of backoff parameter values comprises twelve separate non-zero integer multiples of the duration of the random access preamble.

5. The method of claim 3, wherein the plurality of non-zero integer multiples of the duration of the random access preamble include backoff parameter values equal to 40 multiples of the duration of the random access preamble, 80 multiples of the duration of the random access preamble, 160 multiples of the duration of the random access preamble, 320 multiples of the duration of the random access preamble, 640 multiples of the duration of the random access preamble, 1280 multiples of the duration of the random access preamble, 2500 multiples of the duration of the random access preamble, 5120 multiples of the duration of the random access preamble, 20,480 multiples of the duration of the random access preamble, 40,960 multiples of the duration of the random access preamble, and 81,920 multiples of the duration of the random access preamble.

6. The method of claim 5, wherein the backoff parameter value indicated by the backoff indicator is set to one of the backoff parameter values included in the plurality of non-zero integer multiples of the duration of the random access preamble.

7. The method of claim 1, wherein the second random access transmission is transmitted over a different carrier or band than the first random access transmission.

8. A user equipment (UE) comprising:
a processor; and
a non-transitory computer readable storage medium storing programming for execution by the processor, the programming including instructions to:
receive a backoff indication;
transmit a first random access transmission of a random access preamble to initiate a random access procedure;
determine that reception of a random access response corresponding to the first random access transmission of the random access preamble was not successful;
select a backoff parameter value from a set of backoff parameter values based on the backoff indication, the set of backoff parameter values consisting of multiples of a duration of the random access preamble of the UE; and
transmit a second random access transmission upon expiration of a backoff time following the determination that reception of the random access response corresponding to the first random access transmission of the random access preamble was not successful, the backoff time being randomly selected from between zero and the selected backoff parameter value.

9. The UE of claim 8, wherein the set of backoff parameter values are stored by the UE.

10. The UE of claim 8, wherein the set of backoff parameter values consists of a zero multiple of the duration of the random access preamble and a plurality of non-zero integer multiples of the duration of the random access preamble.

11. The UE of claim 10, wherein the set of backoff parameter values comprises twelve separate non-zero integer multiples of the duration of the random access preamble.

12. The UE of claim 10, wherein the plurality of non-zero integer multiples of the duration of the random access preamble include backoff parameter values equal to 40 multiples of the duration of the random access preamble, 80 multiples of the duration of the random access preamble, 160 multiples of the duration of the random access preamble, 320 multiples of the duration of the random access preamble, 640 multiples of the duration of the random access preamble, 1280 multiples of the duration of the random access preamble, 2500 multiples of the duration of the random access preamble, 5120 multiples of the duration of the random access preamble, 20,480 multiples of the duration of the random access preamble, 40,960 multiples of the duration of the random access preamble, and 81,920 multiples of the duration of the random access preamble.

13. The UE of claim 10, wherein the backoff parameter value indicated by the backoff indicator is set to one of the backoff parameter values included in the plurality of non-zero integer multiples of the duration of the random access preamble.

14. The UE of claim 8, wherein the second random access transmission is transmitted over a different carrier or band than the first random access transmission.

15. A method for facilitating random access, the method comprising:
transmitting, by a base station, a backoff indicator to a user equipment (UE), the backoff indicator indicating a backoff parameter value in a set of backoff parameter values that consists of integer multiples of a duration of a random access preamble of the UE; and
receiving, by the base station, a random access transmission from the UE, the random access transmission performed in accordance with the backoff parameter value indicated by the backoff indicator.

16. The method of claim 15, further comprising:
adjusting, by the base station, the backoff indicator to indicate a different backoff parameter value in the set of backoff parameter values based on a change in a random access preamble duration; and
transmitting, by the base station, the adjusted backoff indicator to the UE; and
receiving, by the base station, a subsequent random access transmission from the UE, the subsequent random access transmission performed in accordance with the backoff parameter value indicated by the adjusted backoff indicator.

17. The method of claim 16, wherein the subsequent random access transmission is received over a different carrier or band than the random access transmission.

18. The method of claim 15, wherein the set of backoff parameter values consists of a zero multiple of the duration of the random access preamble and a plurality of non-zero integer multiples of the duration of the random access preamble.

19. The method of claim 18, wherein the set of backoff parameter values comprises twelve separate non-zero integer multiples of the duration of the random access preamble.

20. The method of claim 18, wherein the plurality of non-zero integer multiples of the duration of the random access preamble include backoff parameter values equal to 40 multiples of the duration of the random access preamble, 80 multiples of the duration of the random access preamble, 160 multiples of the duration of the random access preamble, 320 multiples of the duration of the random access preamble, 640 multiples of the duration of the random access preamble, 1280 multiples of the duration of the random access preamble, 2500 multiples of the duration of the random access preamble, 5120 multiples of the duration of the random access preamble, 20,480 multiples of the duration of the random access preamble, 40,960 multiples of the duration of the random access preamble, and 81,920 multiples of the duration of the random access preamble.

21. The method of claim 20, wherein the backoff parameter value indicated by the backoff indicator is set to one of the backoff parameter values included in the plurality of non-zero integer multiples of the duration of the random access preamble.

22. A base station comprising:
a processor; and
a non-transitory computer readable storage medium storing programming for execution by the processor, the programming including instructions to:
transmit a backoff indicator to a user equipment (UE), the backoff indicator indicating a backoff parameter value in a set of backoff parameter values that consists of integer multiples of a duration of a random access preamble of the UE; and
receive a random access transmission from the UE, the random access transmission performed in accordance with the backoff parameter value indicated by the backoff indicator.

23. The base station of claim 22, wherein the programming further includes instructions to:
adjust the backoff indicator to indicate a different backoff parameter value in the set of backoff parameter values based on a change in a random access preamble duration; and
transmit the adjusted backoff indicator to the UE; and
receive a subsequent random access transmission from the UE, the subsequent random access transmission performed in accordance with the backoff parameter value indicated by the adjusted backoff indicator.

24. The base station of claim 23, wherein the subsequent random access transmission is received over a different carrier or band than the random access transmission.

25. The base station of claim 22, wherein the set of backoff parameter values consists of a zero multiple of the duration of the random access preamble and a plurality of non-zero integer multiples of the duration of the random access preamble.

26. The base station of claim 25, wherein the set of backoff parameter values comprises twelve separate non-zero integer multiples of the duration of the random access preamble.

27. The base station of claim 25, wherein the plurality of non-zero integer multiples of the duration of the random access preamble include backoff parameter values equal to 40 multiples of the duration of the random access preamble, 80 multiples of the duration of the random access preamble, 160 multiples of the duration of the random access preamble, 320 multiples of the duration of the random access preamble, 640 multiples of the duration of the random access preamble, 1280 multiples of the duration of the random access preamble, 2500 multiples of the duration of the random access preamble, 5120 multiples of the duration of the random access preamble, 20,480 multiples of the duration of the random access preamble, 40,960 multiples of the duration of the random access preamble, and 81,920 multiples of the duration of the random access preamble.

28. The base station of claim 27, wherein the backoff parameter value indicated by the backoff indicator is set to one of the backoff parameter values included in the plurality of non-zero integer multiples of the duration of the random access preamble.

29. The method of claim 16, wherein the random access transmission is a re-transmission of the random access preamble.

30. The method of claim 1, wherein the UE receives the backoff indication after transmitting the first random access transmission of the random access preamble.

31. The method of claim 1, wherein the second random access transmission includes the same random access preamble as the first random access transmission.

* * * * *